(12) United States Patent
Torkos et al.

(10) Patent No.: US 11,749,018 B1
(45) Date of Patent: Sep. 5, 2023

(54) EYE ENROLLMENT FOR HEAD-MOUNTED ENCLOSURE

(71) Applicants: Nick Torkos, Redwood City, CA (US); Duncan A. McRoberts, Santa Clara, CA (US); Pierric Gimmig, Sunnyvale, CA (US)

(72) Inventors: Nick Torkos, Redwood City, CA (US); Duncan A. McRoberts, Santa Clara, CA (US); Pierric Gimmig, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/876,615

(22) Filed: Jul. 29, 2022

Related U.S. Application Data

(63) Continuation of application No. 16/886,112, filed on May 28, 2020, now abandoned.

(60) Provisional application No. 62/853,333, filed on May 28, 2019.

(51) Int. Cl.
| | |
|---|---|
| *G06V 40/16* | (2022.01) |
| *G06V 10/22* | (2022.01) |
| *G06V 20/64* | (2022.01) |
| *G06F 3/01* | (2006.01) |
| *G02B 27/01* | (2006.01) |

(52) U.S. Cl.
CPC ....... *G06V 40/165* (2022.01); *G02B 27/0172* (2013.01); *G06F 3/013* (2013.01); *G06V 10/22* (2022.01); *G06V 20/64* (2022.01); *G02B 2027/014* (2013.01); *G02B 2027/0134* (2013.01)

(58) Field of Classification Search
CPC ...... G06V 40/165; G06V 10/22; G06V 20/64; G02B 27/017; G02B 27/0172; G02B 2027/0134; G02B 2027/014; G06F 3/013
See application file for complete search history.

(56) References Cited

U.S. PATENT DOCUMENTS

| | | |
|---|---|---|
| 2008/0169998 A1 | 7/2008 | Jacobsen et al. |
| 2010/0079356 A1 | 4/2010 | Hoellwarth |
| 2012/0068913 A1 | 3/2012 | Bar-Zeev et al. |

(Continued)

FOREIGN PATENT DOCUMENTS

| | | |
|---|---|---|
| CN | 102045577 A | 5/2011 |
| CN | 102959616 A | 3/2013 |

(Continued)

OTHER PUBLICATIONS

Fuhrmann, A., et al., (2000) Practical Calibration Procedures for Augmented Reality. In: Mulder J., van Liere R. (eds) Virtual Environments 2000. Eurographics. Springer, Vienna (12 pp).

Moss, Jason, "Characteristics of Head Mounted Displays and Their Effects on Simulator Sickness", Clemson University, TigerPrints, Dissertations, (2008), Paper 214, 187 pp.

Schroeder, William E., "Head-Mounted Computer Interface Based on Eye Tracking", Proceedings of the SPIE, vol. 2094, p. 1114-1124 (Oct. 1993), 2 pp.

(Continued)

*Primary Examiner* — Nitin Patel
*Assistant Examiner* — Cory A Almeida
(74) *Attorney, Agent, or Firm* — Young Basile Hanlon & MacFarlane, P.C.

(57) ABSTRACT

Systems and methods for eye enrollment for a head-mounted enclosure are described. Some implementations may include an image sensor; and a processing apparatus configured to: access a set of images, captured using the image sensor, that depict a face of a user and a head-mounted enclosure that the user is wearing; and determine, based on the set of images, a first position of a first eye of the user relative to the head-mounted enclosure.

24 Claims, 11 Drawing Sheets

(56) References Cited

U.S. PATENT DOCUMENTS

| | | |
|---|---|---|
| 2012/0242697 A1 | 9/2012 | Border et al. |
| 2013/0050833 A1 | 2/2013 | Lewis et al. |
| 2013/0083173 A1* | 4/2013 | Geisner ............... G02B 27/017 348/51 |
| 2014/0104692 A1 | 4/2014 | Bickerstaff et al. |
| 2014/0125789 A1 | 5/2014 | Bond et al. |
| 2014/0153102 A1 | 6/2014 | Chang |
| 2014/0375680 A1 | 12/2014 | Ackerman et al. |
| 2015/0293644 A1 | 10/2015 | Watanabe et al. |
| 2015/0323792 A1 | 11/2015 | Kinoshita |
| 2016/0282619 A1 | 9/2016 | Oto et al. |
| 2016/0378204 A1 | 12/2016 | Chen et al. |
| 2017/0329136 A1 | 11/2017 | Bates et al. |
| 2018/0095542 A1 | 4/2018 | Mallinson |
| 2018/0096503 A1 | 4/2018 | Kaehler et al. |
| 2018/0096519 A1 | 4/2018 | Tokubo |
| 2018/0137678 A1 | 5/2018 | Kaehler |
| 2018/0158246 A1* | 6/2018 | Grau ..................... G06T 3/0093 |
| 2018/0239146 A1 | 8/2018 | Bierhuizen et al. |
| 2020/0089002 A1 | 3/2020 | Lee |
| 2020/0166755 A1 | 5/2020 | Watanabe |

FOREIGN PATENT DOCUMENTS

| | | |
|---|---|---|
| CN | 104603673 A | 5/2015 |
| CN | 106170083 A | 11/2016 |

OTHER PUBLICATIONS

Orlosky, J., et al., "ModulAR: eye-controlled vision augmentations for head mounted displays", IEEE Trans Vis Comput Graph., Nov. 2015, https://www.ncbi.nlm.nih.gov/pubmed/26439827, 2 pp.

apple.com, "Use Face ID on iPhone X", Apple Support, downloaded Feb. 21, 2018, https://support.apple.com/en-s/HT208109, 5 pp.

Curatu, C., et al., "Projection-based head-mounted display with eye-tracking capabilities", Proceedings of SPIE vol. 5875 (SPIE, Bellingham, WA, 2005), 9 pp.

apple.com, "About Face ID Advanced Technology", Apple Support, downloaded Feb. 21, 2018, https://support.apple.com/e-us/HT208108, 4 pp.

* cited by examiner

600

610
DETERMINE, BASED ON SET OF IMAGES, POSITION OF ANOTHER FACIAL FEATURE OF THE USER RELATIVE TO THE HEAD-MOUNTED ENCLOSURE

620
ACCESS A FACIAL GEOMETRY MODEL FOR THE USER

630
DETERMINE POSITION(S) OF EYE(S) OF THE USER RELATIVE TO THE HEAD-MOUNTED ENCLOSURE BASED ON THE POSITION OF THE OTHER FACIAL FEATURE AND THE FACIAL GEOMETRY MODEL

FIG. 6

EYE ENROLLMENT FOR HEAD-MOUNTED ENCLOSURE

CROSS-REFERENCE TO RELATED APPLICATION(S)

This application is a continuation of U.S. patent application Ser. No. 16/886,112, filed May 28, 2020, which claims the benefit of U.S. Provisional Application No. 62/853,333, filed on May 28, 2019. The content of the foregoing application is incorporated herein by reference in its entirety for all purposes.

TECHNICAL FIELD

This disclosure relates to eye enrollment for head-mounted enclosure.

BACKGROUND

Head-mounted displays are used to provide virtual reality, augmented reality, and/or computer-generated reality experiences for users. Head-mounted displays are typically one-size-fits-all. Facial geometries can vary significantly from person to person. Deviations of the positions of the eyes of a user from expected nominal positions relative to a head-mounted display can be a cause of image distortion. Manual adjustments of the shape of a head-mounted display can be made to try to mitigate this source of distortion.

SUMMARY

Disclosed herein are implementations of eye enrollment for head-mounted enclosure.

In a first aspect, the subject matter described in this specification can be embodied in systems that include an image sensor. The systems include a processing apparatus configured to access a set of images, captured using the image sensor, that depict a face of a user and a head-mounted enclosure that the user is wearing; detect a marker on the head-mounted enclosure in the set of images; determine a region of interest in a first image of the set of images based on a pose of the marker; crop the first image to the region of interest to obtain a cropped image; and determine, based on the cropped image, a first position of a first eye of the user relative to the head-mounted enclosure.

In a second aspect, the subject matter described in this specification can be embodied in methods that include capturing a set of images that depict a face of a user and a head-mounted enclosure that the user is wearing; detecting a marker on the head-mounted enclosure in the set of images; determining a region of interest in a first image of the set of images based on a pose of the marker; cropping the first image to the region of interest to obtain a cropped image; and determining, based on the cropped image, a first position of a first eye of the user relative to the head-mounted enclosure.

In a third aspect, the subject matter described in this specification can be embodied in methods that include capturing a set of images that depict one or more eyes of a user via reflection in an optical assembly of a head-mounted enclosure that the user is wearing; determining, based on the set of images, a first position of a first eye of the user relative to the head-mounted enclosure; and determining, based on the set of images, a second position of a second eye of the user relative to the head-mounted enclosure.

In a fourth aspect, the subject matter described in this specification can be embodied in methods that include capturing a set of images that depict a face of a user and a head-mounted enclosure that the user is wearing; detecting a marker on the head-mounted enclosure in the set of images; determining a region of interest in a first image of the set of images based on a pose of the marker; and determining, based on pixels of the first image in the region of interest, a first position of a first eye of the user relative to the head-mounted enclosure.

In a fifth aspect, the subject matter described in this specification can be embodied in systems that include an image sensor. The systems include a processing apparatus configured to access a set of images, captured using the image sensor, that depict a face of a user and a head-mounted enclosure that the user is wearing; detect a marker on the head-mounted enclosure in the set of images; determine a region of interest in a first image of the set of images based on a pose of the marker; and determine, based on pixels of the first image in the region of interest, a first position of a first eye of the user relative to the head-mounted enclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is a flowchart of an example of a process for determining a position for one or more eyes of a user relative to a head-mounted enclosure.

DETAILED DESCRIPTION

Figure 1A:
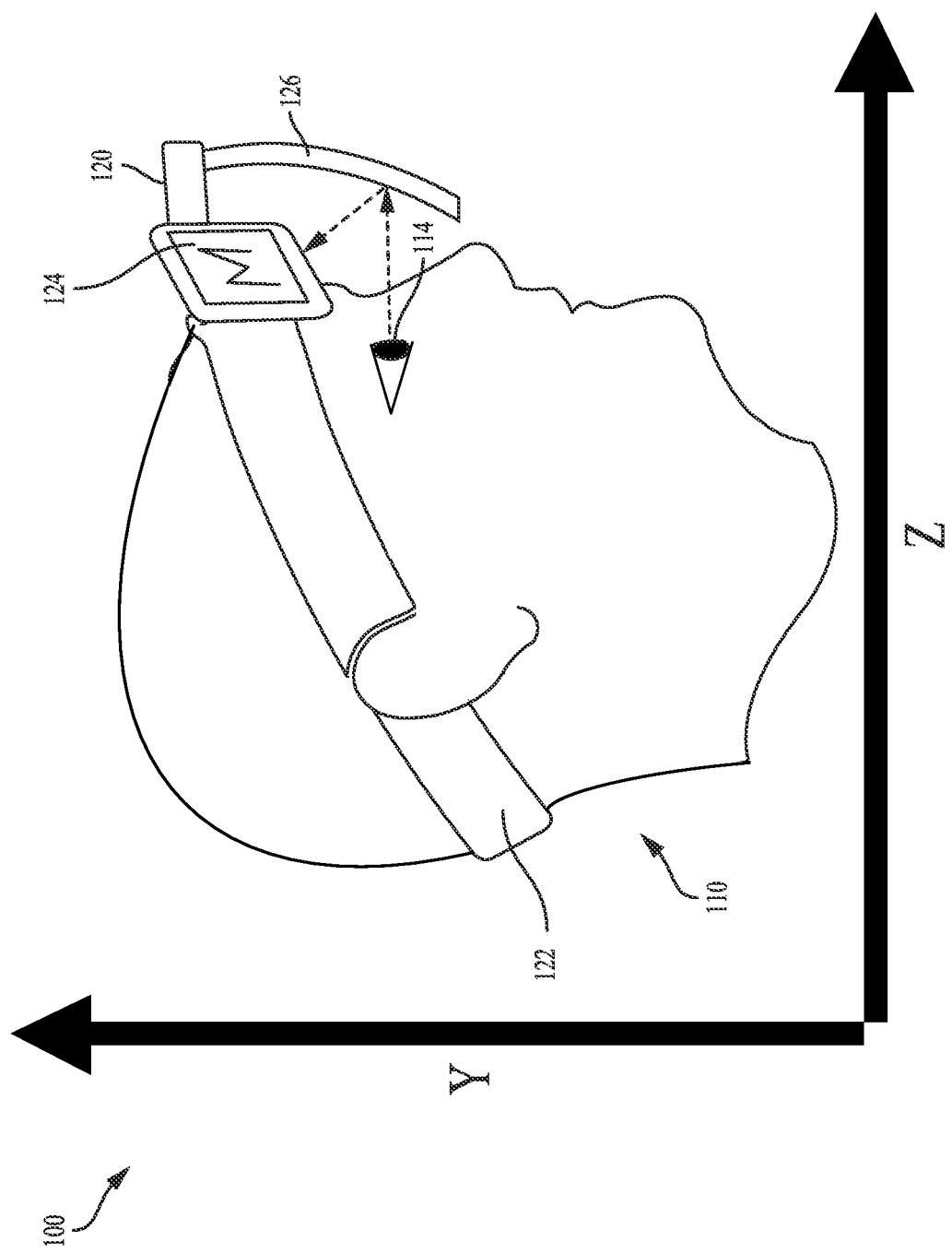
FIG. 1A is an illustration of an example of a head-mounted enclosure worn by a user.

Computer-generated reality applications may be provided using a head-mounted enclosure that is worn on the head of a user and is configured to present images from a display device mounted in the head-mounted enclosure, via an optical assembly (e.g., including a lens and/or a mirror), to the eyes of the user. The relative positions of the display device, the optical assembly, and the eyes of the user affect how a presented image is perceived by the user. For example, an error in assumed eye positions relative to the head-mounted enclosure may alter the perspective and perceived depth of objects appearing in the image and thus distort an intended correspondence between real and virtual objects in a computer-generated reality environment. For example, an error in assumed eye positions relative to the head-mounted enclosure may distort an image presented to the user and negatively affect an ability of the user to mentally fuse images seen by their two eyes (e.g., to enable stereoscopic vision). Accurate position information for the eyes relative to the head-mounted enclosure is thus an important aspect of providing high quality computer-generated reality experiences. Because human heads can vary in their geometry significantly between different individuals and head-mounted enclosures can be positioned differently on a user between usage sessions, it is advantageous to efficiently and accurately determine the positions of a user's eyes when the user puts on a head-mounted enclosure. Manual calibration techniques for a head-mounted enclosure may include many steps that ask for significant feedback and attentive interaction with the user. These manual calibration processes can be confusing (especially for new users) and can be error prone.

Eye enrollment processes and systems for head-mounted enclosures may be used to efficiently and accurately estimate the positions of a user's eyes relative to a head-mounted enclosure worn by the user. In some implementations, two computing devices are used for eye enrollment. A first computing device captures images depicting both the face of the user and the head-mounted enclosure that is worn by the user. Computer vision and tracking techniques may be used to determine the positions of the eyes relative to the head-mounted enclosure. The resulting eye enrollment data may be used by a second computing device that is mounted in the head-mounted enclosure worn by the user to calibrate the image presentation system of the head-mounted enclosure in order to present high quality images of virtual objects to the user. For example, a three-dimensional transformation may be determined based on eye position and used for adjusting a virtual camera for an eye of the user to better match the position of the eye. For example, a distortion map may be determined based on eye position and used to correct for distortion caused by an optical assembly (e.g., a lens) as viewed from the position of the eye.

For example, configuration information for a head-mounted enclosure may be installed on a personal computing device (e.g., as part of an app installed on a smartphone), which may specify a marker to track, as well as a three-dimensional surface, such as a rectangle, with a three-dimensional offset and orientation relative to the marker. In some implementations, the three-dimensional surface represents a surface that can be ray-casted against to search for eyes. To enroll eye positions, the personal computing device (e.g., a mobile device) runs software with image tracking and searches for the candidate marker. When found, the ray casting surface may be determined in the appropriate position relative to the tracked marker on the head-mounted enclosure. Then the personal computing device performs a focused search for eyes in the camera data that the ray casted surface overlaps.

In some implementations, the camera provides depth data (e.g., in a depth channel), and rays at the center of each eye and the depth at the center of each eye are used to determine positions for the eyes. The eye offsets may then be calculated relative to the tracked marker of the head-mounted enclosure. This eye position information may then be used to calculate where the eyes are positioned relative to the head-mounted enclosure. In some implementations, the camera does not provide depth data, and the depth of the detected objects appearing in the three-dimensional surface may be estimated as an appropriate depth by testing different depths for the surrounding eye features (e.g., a nose bridge, eyebrows, or corners of eyes) and utilizing the one with the least swimming. This technique may be employed to determine real world positions for eyes of a user wearing the head-mounted enclosure relative to the head-mounted enclosure.

In some implementations, a personal computing device (e.g., a mobile phone) is separated from the head-mounted enclosure during the eye enrollment process. For example, the personal computing device, including an image sensor, may be held in a hand of the user wearing the head-mounted enclosure to acquire views of the marker on the head-mounted enclosure and face of the user. In some implementations, a personal computing device (e.g., a mobile phone) is mounted in the head-mounted enclosure during the eye enrollment process and the user enrolls by looking at themselves in the mirror to acquire views of the marker on the head-mounted enclosure and face of the user wearing the head-mounted enclosure.

For example, an eye enrollment process may be performed using an image capture device (e.g., a smartphone) that is attached (e.g., already mounted in) the head-mounted enclosure by processing images that depict a reflection of the eye of a user on optical assembly of the head-mounted enclosure, instead of a direct view of the eye. In some implementations, a personal computing device is mounted in the head-mounted enclosure, and a camera of the device can view the eyes of the user when the phone is fully mounted. In some implementations, a personal computing device is mounted in the head-mounted enclosure, and a camera of the device can view the eyes of the user as the personal computing is moving in relation to the head-mounted enclosure during a mounting process (e.g., as a smartphone is slid into a mounting slot in the head-mounted enclosure).

Using the described eye enrollment systems and processes can provide advantages over some conventional systems for providing computer-generated reality experiences to users. For example, performing an eye enrollment may improve the quality of computer-generated reality images as perceived by the user. For example, an eye enrollment can conveniently and/or automatically calibrate the virtual object presentation system for a computer-generated reality application. In some implementations, an eye enrollment procedure is largely automated and can be completed quickly.

Figure 1B:
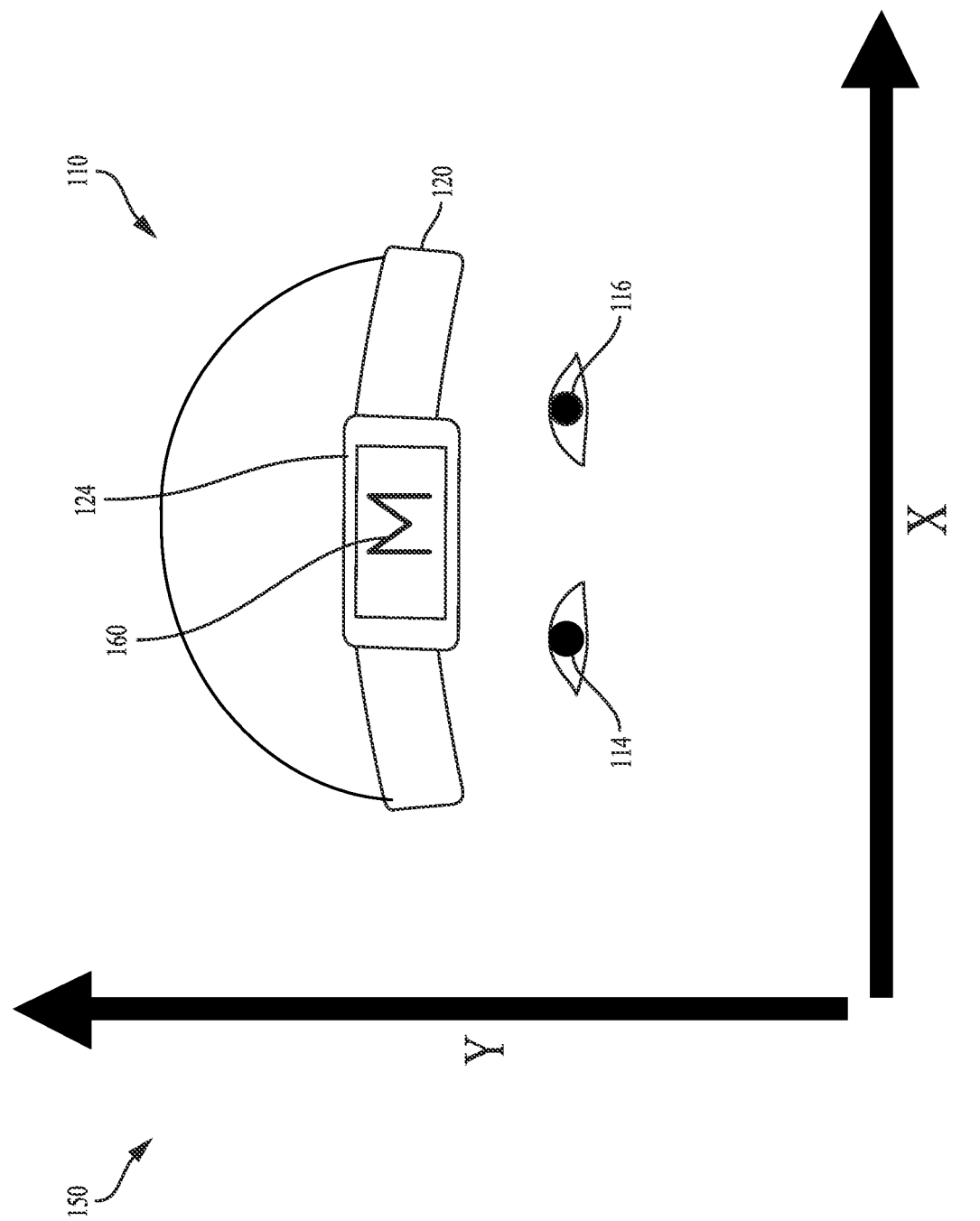
FIG. 1B is an illustration of an example of a head-mounted enclosure worn by a user.

FIGS. 1A and 1B are an illustrations of an example of a head-mounted enclosure worn by a user. FIG. 1A shows a side profile 100 of a user 110 wearing a head-mounted enclosure 120. The head-mounted enclosure 120 includes a fastening article 122, a display device 124, and an optical assembly 126. The fastening article 122 (e.g., including a headband) is configured to hold the head-mounted enclosure 120 in position on a head of the user 110 when worn by the user 110. A coordinate system with reference to the head-mounted enclosure 120 may include three dimensions for specifying the spatial positions of objects, such a right eye 114 of the user 110, relative to the head-mounted enclosure 120. Two of the dimensions of this coordinate system (labeled "Y" and "Z") are shown in the side profile 100 of FIG. 1A.

The display device 124 is configured to present images that may be viewed by the user via the optical assembly 126. For example, the display device 124 may be a personal computing device (e.g., a smartphone) that is configured to present images on a touchscreen. The display device 124 may be removably mounted in the head-mounted enclosure 120. In some implementations, the display device 124 is permanently attached to the head-mounted enclosure 120.

The optical assembly 126 (e.g., a lens and/or a mirror) is configured to direct light from the display device 124 and/or from an environment around the user to eyes of the user 110. For example, the optical assembly 126 may include a partially reflective polarizing film applied to an inner surface of a transparent visor. The optical assembly 126 may function as an optical combiner. A right eye 114 of the user 110 is shown in the side profile 100 of FIG. 1A. For example, light forming an image may be emitted from the display device 124 and be directed to the right eye 114 via the optical assembly 126. In some implementations, the optical assembly 126 includes a mirror that reflects light from the display device 124 to the right eye 114. In some implementations, the optical assembly 126 includes a lens that reflects light from the display device 124 to the right eye 114. For example, a lens of the optical assembly 126 may also let light from an environment in front of the user 110 pass through to reach the right eye 114 and allow the user 110 to see in front of him while having objects depicted in an image presented by the display device 124 overlaid on a view of the physical environment in front of the user 110. In some implementations, a transparency of the optical assembly 126 (e.g., a lens) may be adjusted to suit an application (e.g., a computer-generated reality application).

Accurate position information for eyes of the user 110 may be used to better project an image (e.g., a computer-generated reality image) from the display device 124 to the right eye 114 via the optical assembly 126. The position of the eyes of the user 110 relative to the head-mounted enclosure 120 affects how an image presented by the display device 124 is perceived by the user. For example, changes in the position of the eyes of the user 110 relative to the head-mounted enclosure 120 may alter the perspective and/or perceived depth of objects appearing in a presented image. Thus, knowledge of the eye positions may be used to control presentation of objects to the user, such as at a particular location in an augmented reality space. Errors in estimates of the positions of the eyes may distort a presented image and/or negatively impact an ability of the user 110 to fuse for stereoscopic vision.

FIG. 1B shows a front profile 150 of a user 110 wearing a head-mounted enclosure 120. The front profile 150 shows both the right eye 114 and a left eye 116 of the user 110. A coordinate system with reference to the head-mounted enclosure 120 may include three dimensions for specifying the spatial positions of objects, such a right eye 114 and the left eye 116 of the user 110, relative to the head-mounted enclosure 120. Two of the dimensions of this coordinate system (labeled "Y" and "X") are shown in the front profile 150 of FIG. 1A. In this example, the optical assembly 126 is temporarily removed or transparent, allowing a view from in front of the user 110 of the display device 124 mounted in the head-mounted enclosure 120. In this example, the display device is presenting a marker 160. This known marker 160 may be detected in a captured image depicting a face of the user 110 (e.g., including the right eye 114 and the left eye 116) and the head-mounted enclosure 120 worn by the user 110. Knowledge of the size and shape of the marker 160 may be used to identify and position and/or orientation of the head-mounted display as it appears in the captured image and facilitate the determination of the positions of the right eye 114 and the left eye 116 relative to the head-mounted enclosure 120.

The positions of the eyes of the user 110 can be determined by a manual calibration process that uses significant fine-grained feedback from the user to detect or adjust for particular eye positions of the user 110 relative to the head-mounted enclosure 120 being worn. However, some manual processes for calibration for eye positions can include several steps, can be confusing for a new user, and/or can be error prone.

An eye enrollment process may be used to calibrate a system including the head-mounted enclosure 120 worn by the user 110 to present quality images via the optical assembly 126 by determining the positions of the eyes of the user 110 relative to the head-mounted enclosure 120 and/or to each other. In some implementations, positions of the right eye 114 and the left eye 116 may be determined as respective offsets relative to a predefined point in the coordinate system of the head-mounted enclosure 120 (e.g., with the axes labeled "X", "Y", and "Z" in FIGS. 1A-1B). For example, an eye enrollment process may be performed when the user puts on the head-mounted enclosure 120 at the start of session of use. An eye enrollment process may operate with less user interaction by capturing images that include both the face, including at least an eye, of the user and the head-mounted enclosure in a field of view of the captured images. The positions of the eyes of the user 110 may be determined based on the captured images and used to calibrate the presentation of images to the user 110 from the display device 124 via the optical assembly 126. For example, eye enrollment may be performed by implementing the process 500 of FIG. 5. In some implementations, a separate device (e.g., a smartphone) is used to capture the images of the face and the head-mounted enclosure 120 worn by the user 110 for eye enrollment. Eye position information may then be transmitted to the display device 124 to complete the calibration to enable quality presentation of images to the user 110. In some implementations, a single device (e.g., the display device 124) is used both to capture the images of the face and the head-mounted enclosure 120 worn by the user 110 for eye enrollment and to display images to the user using the resulting calibration data. For example, the display device 124 may include an image sensor that captures the images of the face and the head-mounted enclosure 120 worn by the user 110 for eye enrollment while the display device 124 is held in a hand of the user 110. After capture of these images, the display device 124 may be mounted in place in the head-mounted enclosure 120, as shown in FIG. 1A, and the calibration information generated may be used to enable quality presentation of images to the user 110. In some implementations, the display device includes an image sensor and is configured to perform an eye enrollment process while mounted in the head-mounted enclosure 120, by capturing images of the eyes via reflection off the optical assembly 126 (e.g., including a mirror and/or a lens). Information about eye positions is important for good computer-generated reality user experiences. An effective eye enrollment process may obviate the use of complex eye tracking systems that dynamically track eye position and orientation and avoid use additional expensive sensors built into a head-mounted enclosure for eye tracking.

In some implementations (not shown in FIG. 1B), a marker similar to the marker 160 may be implemented as a physical feature (e.g., a painted and/or raised symbol) of the head-mounted enclosure, rather than being part of an image presented on a display. For example, a marker feature may be positioned in a slot behind were the display device 124 is mounted in the head-mounted enclosure 120. The marker feature may appear in images captured for eye enrollment before the display device is mounted in the head-mounted enclosure 120 worn by the user 110. For example, this marker feature may be used where the display device 124 includes an image sensor and is used to perform eye enrollment and to present images to the user.

Figure 2:
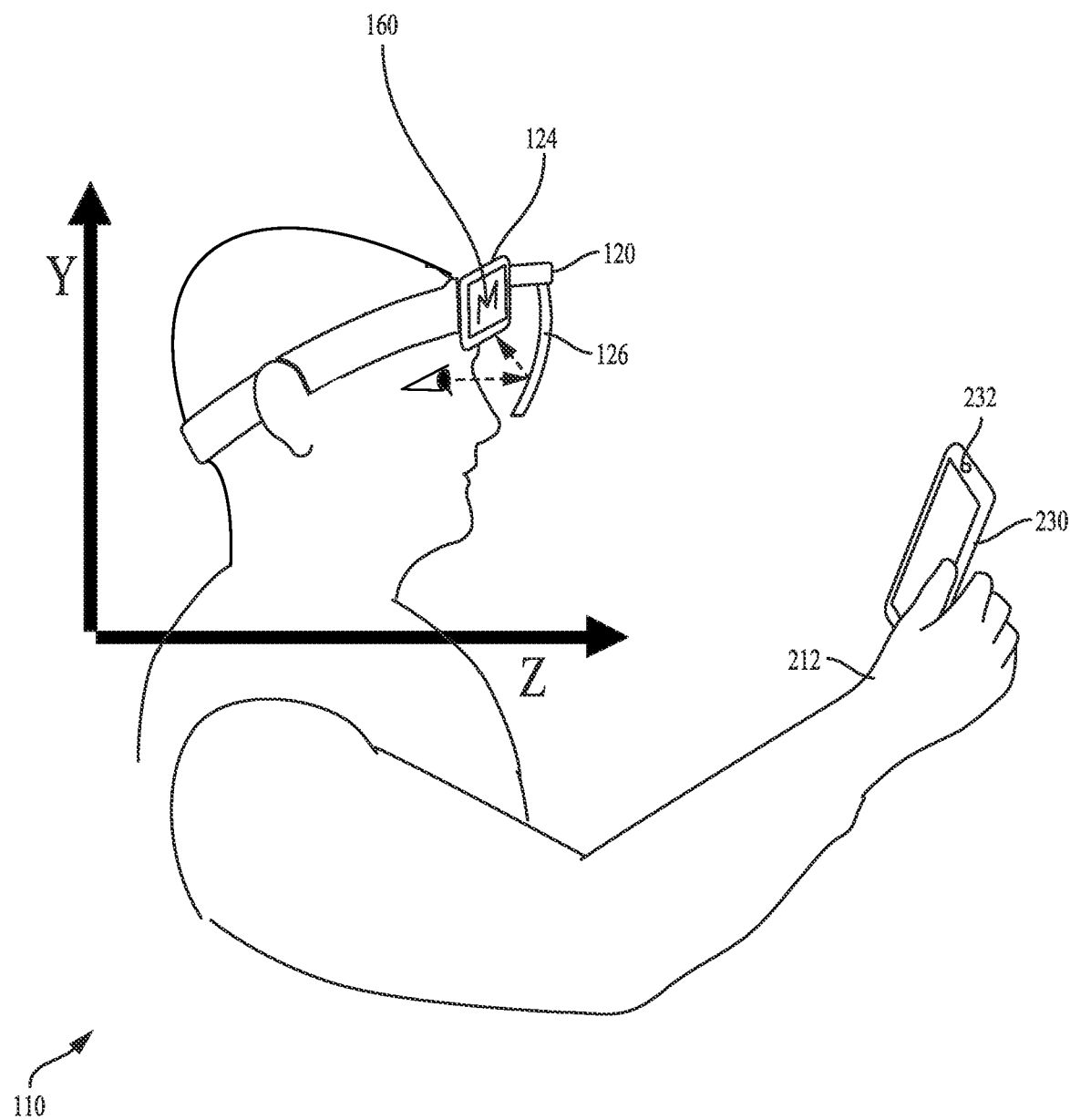
FIG. 2 is an illustration of an example of a user wearing a head-mounted enclosure during an eye enrollment process.

FIG. 2 is an illustration of an example of a user 110 wearing a head-mounted enclosure 120 during an eye enrollment process. In this example, two computing devices (e.g., two smartphones) are used to perform the eye enrollment. A first computing device is the display device 124 that is mounted in the head-mounted enclosure 120 that is worn by the user 110. The display device presents the marker symbol 160 on its display. A second computing device in a personal computing device 230 that is held by the user 110 in a hand 212 of the user. The personal computing device 230 includes one or more image sensors 232 (e.g., sensing infrared and/or visible spectrum light) that are directed at a face of the user 110 while the user is wearing the head-mounted enclosure 120. A set of images is captured using the one or more image sensors 232, where the images depict the face of the user 110 and the head-mounted enclosure 120 that the user is wearing. In some implementations, the user 110 may turn their heads during the eye enrollment process so that the set of images includes a diversity of perspectives of the face and the head-mounted enclosure 120. The set of images captured may be processed with face tracking and marker tracking systems to determine positions of eyes of the user 110 relative to the head-mounted enclosure 120. The set of images captured may be processed with face tracking and marker tracking systems to determine orientations of eyes of the user 110 relative to the head-mounted enclosure 120. Data (e.g., eye enrollment data) based on the positions and/or the orientations of the eyes may be transmitted from the personal computing device 230 to the display device 124. The display device 124 may then obtain a three-dimensional transform and/or a distortion map for respective eyes of the user 110 (e.g. the right eye 114 and the left eye 116) that are based on the positions and/or the orientations of the eyes. The three-dimensional transforms and/or a distortion maps may be used to adjust images for presentation via images projected from the display device 124, via the optical assembly 126 (e.g., a lens and/or a mirror), to the eyes of the user. For example, the presented images may be used to implement a computer-generated reality application for the user 110.

Figure 3:
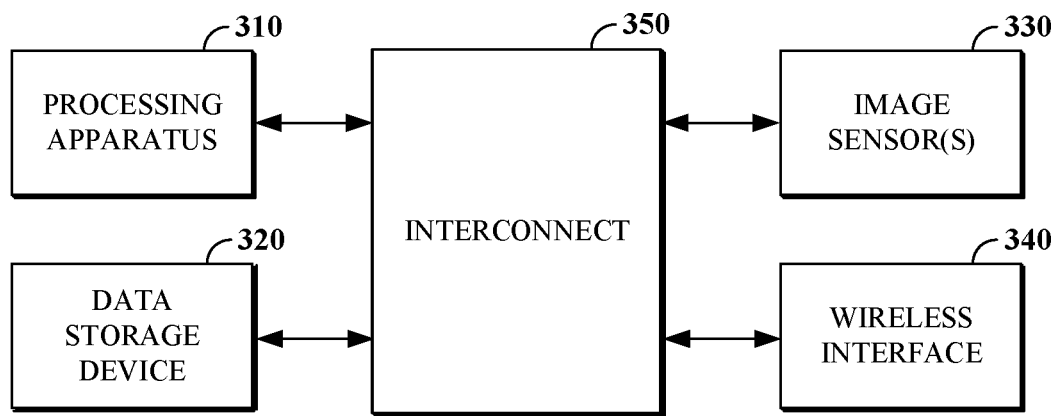
FIG. 3 is a block diagram of an example of a system configured to perform an eye enrollment process for a head-mounted enclosure.

FIG. 3 is a block diagram of an example of a system 300 configured to perform an eye enrollment process for a head-mounted enclosure (e.g., the head-mounted enclosure 120). The system 300 may include a processing apparatus 310, a data storage device 320, an image sensor 330, a wireless communications interface 340, and an interconnect 350 through which the processing apparatus 310 may access the other components. The system 300 may be configured to perform eye enrollment for a user wearing a head-mounted enclosure. For example, the system 300 may be configured to implement the process 500 of FIG. 5. For example, the system 300 may be implemented as part of a personal computing device (e.g., a smartphone or a tablet).

The processing apparatus 310 may be operable to execute instructions that have been stored in a data storage device 320. In some implementations, the processing apparatus 310 is a processor with random access memory for temporarily storing instructions read from the data storage device 320 while the instructions are being executed. The processing apparatus 310 may include single or multiple processors each having single or multiple processing cores. Alternatively, the processing apparatus 310 may include another type of device, or multiple devices, capable of manipulating or processing data. For example, the data storage device 320 may be a non-volatile information storage device such as a hard drive, a solid-state drive, a read-only memory device (ROM), an optical disc, a magnetic disc, or any other suitable type of storage device such as a non-transitory computer readable memory. The data storage device 320 may include another type of device, or multiple devices, capable of storing data for retrieval or processing by the processing apparatus 310. For example, the data storage device 320 can be distributed across multiple machines or devices such as network-based memory or memory in multiple machines performing operations that can be described herein as being performed using a single computing device for ease of explanation. The processing apparatus 310 may access and manipulate data stored in the data storage device 320 via interconnect 350. For example, the data storage device 320 may store instructions executable by the processing apparatus 310 that upon execution by the processing apparatus 310 cause the processing apparatus 310 to perform operations (e.g., operations that implement the process 500 of FIG. 5).

The one or more image sensors 330 may be configured to capture images, converting light incident on the image sensor 330 into a digital images. The one or more image sensors 330 may detect light of a certain spectrum (e.g., a visible spectrum and/or an infrared spectrum) and convey information constituting an image as electrical signals (e.g., analog or digital signals). For example, the one or more image sensors 330 may include charge-coupled devices (CCD) or active pixel sensors in complementary metal-oxide-semiconductor (CMOS). In some implementations, the one or more image sensors 330 include an analog-to-digital converter. For example, the one or more image sensors 330 may include an infrared camera and a visible light camera. In some implementations (not shown in FIG. 3), the system 300 includes an illuminator and/or a projector that projects light that may be reflected off objects in a scene and detected by the one or more image sensors 330. For example, the system 300 may include an infrared illuminator.

The wireless communications interface 340 facilitates communication with other devices. For example, wireless communications interface 340 may facilitate communication via a Wi-Fi network, a Bluetooth link, or a ZigBee link. For example, wireless communications interface 340 may facilitate communication via infrared signals, audio signals, or light signals received using computer vision. In some implementations, the wireless communications interface 340 may be used to transmit calibration data resulting from an eye enrollment process to a display device mounted in a head-mounted enclosure (e.g., the display device 124) that will use the calibration data to present images to a user wearing the head-mounted enclosure. For example, the interconnect 350 may be a system bus, or a wired or wireless network.

The processing apparatus 310 may be configured to perform an eye enrollment process. For example, the processing apparatus 310 may be configured to access a set of images, captured using the image sensor 330, that depict a face of a user (e.g., the user 110) and a head-mounted enclosure (e.g., the head-mounted enclosure 120) that the user is wearing. The processing apparatus 310 may be configured to determine, based on the set of images, a first position of a first eye (e.g., the right eye 114) of the user relative to the head-mounted enclosure. For example, processing apparatus 310 may implement the process 600 of FIG. 6 to determine the first position. The processing apparatus 310 may be configured to determine, based on the set of images, a second position of a second eye (e.g., the left eye 116) of the user relative to the head-mounted enclosure. For example, processing apparatus 310 may implement the process 600 of FIG. 6 to determine the second position. The processing apparatus 310 may be configured to determine, based on the set of images, a first orientation of the first eye of the user relative to the head-mounted enclosure. The processing apparatus 310 may be configured to determine, based on the first position, a three-dimensional transform for a first virtual camera associated with the first eye. The processing apparatus 310 may be configured to determine, based on the first position, a distortion map for the first eye and an optical assembly (e.g., the optical assembly 126) of the head-mounted enclosure. In some implementations, the processing apparatus 310 may be configured to use the wireless communications interface 340 to transmit data based on the first position to a display device (e.g., the display device 124) that is mounted in the head-mounted enclosure.

In some implementations (not shown in FIG. 3), the system 300 includes a display and is configured to both perform an eye enrollment process (e.g., the process 500 of FIG. 5) and use resulting calibration data to present (e.g., using the process 700 of FIG. 7) images to the user (e.g., the user 110) wearing the head-mounted enclosure (e.g., the head-mounted enclosure 120). For example, the system 300 may be implemented as part of a smartphone that is first used from a user's hand to perform an eye enrollment process, and then mounted in the head-mounted enclosure worn by the user to provide a computer-generated reality application. For example, the processing apparatus 310 may be configured to apply the three-dimensional transform to an image to obtain a transformed image. The processing apparatus 310 may be configured to project the transformed image from the display, via an optical assembly (e.g., the optical assembly 126) of the head-mounted enclosure, to the first eye (e.g., the right eye 114). For example, the processing apparatus 310 may be configured to apply a transformation based on the distortion map to an image to obtain a transformed image. For example, the processing apparatus 310 may be configured to project the transformed image from the display, via the optical assembly of the head-mounted enclosure, to the first eye.

Figure 4:
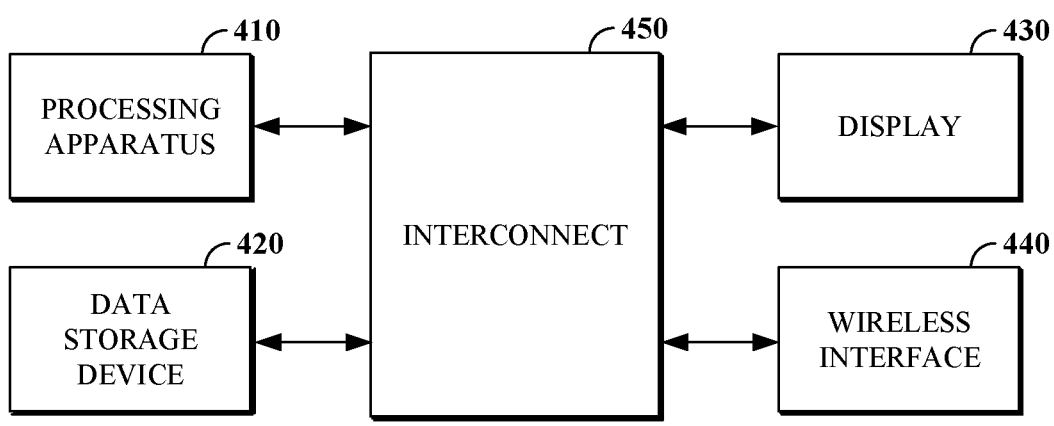
FIG. 4 is a block diagram of an example of a system configured to present images to a user via an optical assembly of a head-mounted enclosure, using eye enrollment data.

FIG. 4 is a block diagram of an example of a system 400 configured to present images to a user (e.g., the user 110) via an optical assembly (e.g., the optical assembly 126) of a head-mounted enclosure (e.g., the head-mounted enclosure 120), using eye enrollment data. The system 400 may include a processing apparatus 410, a data storage device 420, a display 430, a wireless communications interface 440, and an interconnect 450 through which the processing apparatus 410 may access the other components. The system 400 may be configured to present images to a user wearing a head-mounted enclosure (e.g., to enable a computer-generated reality application), using calibration data from an eye enrollment process. For example, the system 400 may be configured to implement the process 700 of FIG. 7. For example, the system 400 may be implemented as part of a display device (e.g., a smartphone), which may be mounted in or otherwise attached to a head-mounted enclosure.

The processing apparatus 410 may be operable to execute instructions that have been stored in a data storage device 420. In some implementations, the processing apparatus 410 is a processor with random access memory for temporarily storing instructions read from the data storage device 420 while the instructions are being executed. The processing apparatus 410 may include single or multiple processors each having single or multiple processing cores. Alternatively, the processing apparatus 410 may include another type of device, or multiple devices, capable of manipulating or processing data. For example, the data storage device 420 may be a non-volatile information storage device such as a hard drive, a solid-state drive, a read-only memory device (ROM), an optical disc, a magnetic disc, or any other suitable type of storage device such as a non-transitory computer readable memory. The data storage device 420 may include another type of device, or multiple devices, capable of storing data for retrieval or processing by the processing apparatus 410. For example, the data storage device 420 can be distributed across multiple machines or devices such as network-based memory or memory in multiple machines performing operations that can be described herein as being performed using a single computing device for ease of explanation. The processing apparatus 410 may access and manipulate data stored in the data storage device 420 via interconnect 450. For example, the data storage device 420 may store instructions executable by the processing apparatus 410 that upon execution by the processing apparatus 410 cause the processing apparatus 410 to perform operations (e.g., operations that implement the process 700 of FIG. 7).

The display 430 may be configured to present images, converting digital images into light projected from the display 430. The display 430 may project light using an array of pixels that project light in a visible spectrum. For example, the display 430 may include a screen. For example, the display 430 may include a liquid crystal display (LCD), a light emitting diode (LED) display (e.g., an OLED display), or other suitable display. For example, the display 430 may include a projector. In some implementations, the display 430 includes fiber optics.

In some implementations (not shown in FIG. 4), the system 400 may include one or more speakers (e.g., headphones or earbuds). The improved accuracy of the three dimensional position and/or orientation of the head-mounted enclosure may be used to enhance the quality and/or accuracy of stereo sound effects. For example, a spatial location of an object making a sound, Doppler effects if the object is moving relative to your ears, or reverb may be reflected in sound played on the one or more speakers. Even a sound made in a shared environment that others would hear (e.g., a whisper behind a virtual reality character's ear) may be played.

The wireless communications interface 440 facilitates communication with other devices. For example, wireless communications interface 440 may facilitate communication via a Wi-Fi network, a Bluetooth link, or a ZigBee link. In some implementations, the wireless communications interface 440 may be used to receive calibration data resulting from an eye enrollment process from a personal computing device (e.g., the personal computing device 230) that has performed an eye enrollment process for a user (e.g., the user 110) wearing a head-mounted enclosure (e.g., the head-mounted enclosure 120). For example, the interconnect 450 may be a system bus, or a wired or wireless network.

The processing apparatus 410 may be configured to access a first three-dimensional transform for a first virtual camera associated with a first eye (e.g., the right eye 114) of a user (e.g., the user 110) that is wearing the head-mounted enclosure (e.g., the head-mounted enclosure 120). The first three-dimensional transform may have been determined based on a position of the first eye relative to the head-mounted enclosure. The processing apparatus 410 may be configured to access a second three-dimensional transform for a second virtual camera associated with a second eye (e.g., the left eye 116) of the user. The second three-dimensional transform may have been determined based on a position of the second eye relative to the head-mounted enclosure. The processing apparatus 410 may be configured to apply the first three-dimensional transform to an image to obtain a first transformed image. The processing apparatus 410 may be configured to project the first transformed image from the display 430, via a lens (e.g., a lens of the optical assembly 126) of the head-mounted enclosure, to the first eye. The processing apparatus 410 may be configured to apply the second three-dimensional transform to an image to obtain a second transformed image. The processing apparatus 410 may be configured to project the second transformed image from the display 430, via the lens of the head-mounted enclosure, to the second eye. In some implementations, the processing apparatus 410 may be configured to access a first distortion map for the first eye and the lens of the head-mounted enclosure. The processing apparatus 410 may be configured to access a second distortion map for the second eye and the lens of the head-mounted enclosure. The processing apparatus 410 may be configured to apply a transformation based on the first distortion map to an image to obtain the first transformed image. The processing apparatus 410 may be configured to apply a transformation based on the second distortion map to an image to obtain the second transformed image.

Figure 5:
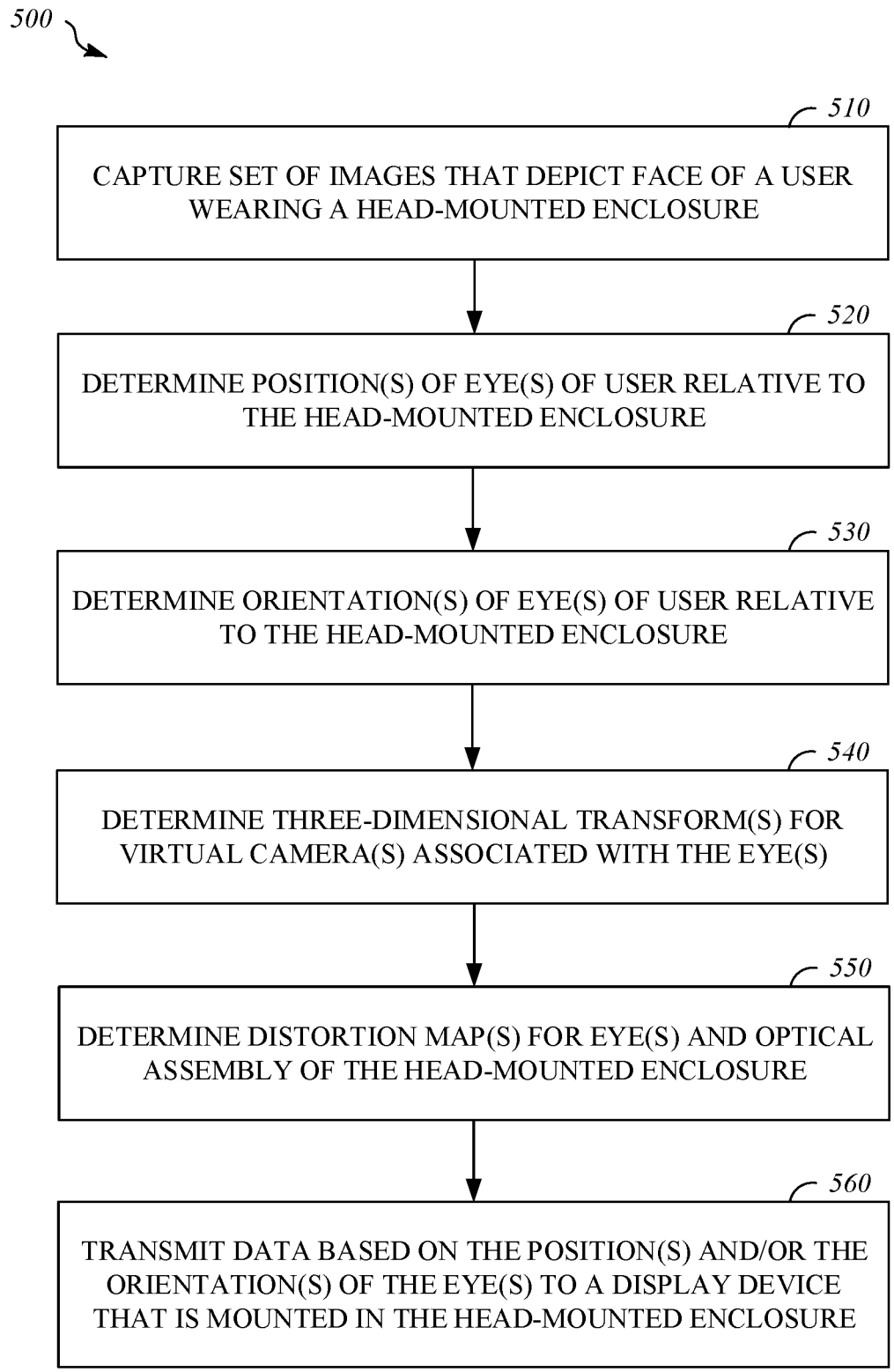
FIG. 5 is a flowchart of an example of a process for eye enrollment for a head-mounted enclosure.

FIG. 5 is a flowchart of an example of a process 500 for eye enrollment for a head-mounted enclosure (e.g., the head-mounted enclosure 120). The process 500 includes capturing 510 a set of images that depict a face of a user wearing the head-mounted enclosure; determining 520 positions of one or more eyes of the user relative to the head-mounted enclosure; determining 530 orientations of one or more eyes of the user relative to the head-mounted enclosure; determining 540 respective three dimensional transforms for respective virtual cameras associated with the one or more eyes of the user; determining 550 distortion maps for one or more eyes of the user and an optical assembly of the head-mounted enclosure; and transmitting 560 data based on the positions and/or the orientations of the one or more eyes to a display device that is mounted in the head-mounted enclosure. For example, the process 500 may be implemented by the personal computing device 230 of FIG. 2. For example, the process 500 may be implemented by the system 300 of FIG. 3.

The process 500 includes capturing 510 a set of images that depict a face of a user (e.g., the user 110) and a head-mounted enclosure (e.g., the head-mounted enclosure 120) that the user is wearing. By depicting both the face of the user and the head-mounted enclosure worn by the user, the set of images conveys information regarding the position of one or more eyes of the user relative to the head-mounted enclosure. For example, the set of images may be captured by an image sensor in a device (e.g., the personal computing device 230) held in a hand of the user (e.g., as illustrated in FIG. 2). For example, the user may hold the device in their hand and point the image sensor at their head while capturing 510 the set of images. In some implementations, the user may turn their head and/or move their hand along an arc around their head to capture 510 images with a diversity of perspectives of the face and the head-mounted enclosure. For example, the one or more image sensors 330 of FIG. 3 may be used to capture 510 the set of images. In some implementations, an external mirror (e.g., hanging on a wall or held in a hand of the user) may be used to facilitate an eye enrollment process using a camera attached to the head-mounted enclosure (e.g., a camera included in the display device 124). The camera in the head-mounted enclosure can capture a set of images, using the external mirror, that include a reflection in the external mirror that depicts both the face of the user and the head-mounted enclosure worn by the user. For example, the set of images may include visible spectrum color (e.g., RGB or YUV) images and/or infrared images.

The process 500 includes determining 520, based on the set of images, a first position of a first eye (e.g., the right eye 114) of the user relative to the head-mounted enclosure. Determining 520 the first position may include tracking the face of the user in the set of images and/or tracking the first eye using computer vision processing applied to the set of images. In some implementations, the position of the first eye may be determined 520 based in part on prior registered geometric model of the face of the user and tracking a collection of one or more other features of the face. For example, the process 600 of FIG. 6 may be implemented to determine 520 the first position of the first eye relative to the head-mounted enclosure. Determining 520 the first position may include tracking the head-mounted enclosure in the set of images using computer vision processing applied to the set of images. In some implementations, a marker (e.g., the displayed marker or a physical marker feature) located on the head-mounted display is tracked to facilitate accurate tracking of a relevant portion of the head mounted enclosure. For example, the first position of the first eye may be determined 520 based on comparison of tracking data for first eye and tracking data for a marker (e.g., the marker 160) on the head-mounted display. The first position of the first eye may be encoded as a three dimensional vector in a coordinate system of the head-mounted enclosure. The first position of the first eye may be an offset from an origin point in the coordinate system of the head-mounted enclosure. In some implementations, the position of the first eye may be determined 520 by focusing a search for the eye on a region of interest in the set of images that is determined by tracking the marker. For example, the process 900 of FIG. 9 may be implemented to determine 520 the first position of the first eye relative to the head-mounted enclosure. The process 500 may also include determining 520, based on the set of images, a second position of a second eye (e.g., the left eye 116) of the user relative to the head-mounted enclosure. The second position of the second eye may be determined 520 using techniques applied to the set of images that are the same or similar to the techniques used to determine 520 the first position of the first eye. For example, the process 600 of FIG. 6 may be implemented to determine 520 the second position of the second eye relative to the head-mounted enclosure. For example, the process 900 of FIG. 9 may be implemented to determine 520 the second position of the second eye relative to the head-mounted enclosure.

The process 500 includes determining 530, based on the set of images, a first orientation of the first eye (e.g., the right eye 114) of the user relative to the head-mounted enclosure. The process 500 may also include determining 530, based on the set of images, a second orientation of the second eye (e.g., the left eye 116) of the user relative to the head-mounted enclosure. For example, determining 530 an orientation of an eye may include tracking a pupil of the eye relative to one or more other features of the face of the user. For example, an orientation of an eye may be encoded as three-tuple of Euler angles or a quaternion expressed in a coordinate system of the head-mounted enclosure.

The process 500 includes determining 540, based on the first position, a first three-dimensional transform for a first virtual camera associated with the first eye. The process 500 may include determining 540, based on the second position, a second three-dimensional transform for a second virtual camera associated with the second eye. For example, the one or more three-dimensional transforms may respectively be encoded as 4×4 3-D transformation matrices. For example, the one or more three-dimensional transforms may include a perspective projection matrix. For example, the first three-dimensional transform and/or the second three-dimensional transform may be determined 540 relative to an origin of calibration in a coordinate system of the head-mounted enclosure. In some implementations, determining 540 a three dimensional transform for an eye includes retrieving a pre-calculated transform from a look-up table that is indexed by a quantized version of the position of the eye relative to the head-mounted enclosure. In some implementations, the first three-dimensional transform is determined 540 based on the orientation of the first eye, in addition to the position of the first eye. In some implementations, the second three-dimensional transform is determined 540 based on the orientation of the second eye, in addition to the position of the second eye.

The process 500 includes determining 550, based on the first position, a first distortion map for the first eye and an optical assembly (e.g., a lens) of the head-mounted enclosure. The process 500 may include determining 550, based on the second position, a second distortion map for the second eye and an optical assembly (e.g., a lens) of the head-mounted enclosure. In some implementations, determining 550 a distortion map for an eye includes retrieving a pre-calculated distortion map from a look-up table that is indexed by a quantized version of the position of the eye relative to the head-mounted enclosure. In some implementations, the first distortion map is determined 540 based on the orientation of the first eye, in addition to the position of the first eye. In some implementations, the second distortion map is determined 540 based on the orientation of the second eye, in addition to the position of the second eye.

The process 500 includes transmitting 560 data based on the first position and the second position to a display device (e.g., the display device 124) that is mounted in the head-mounted enclosure. In some implementations, the data based on the first position and the second position may include the first position and the second position encoded as three-dimensional vectors in a coordinate system of the head-mounted enclosure. In some implementations, the data based on the first position and the second position may include the first three-dimensional transform and/or the second three-dimensional transform encoded as matrices. In some implementations, the data based on the first position and the second position may include the first distortion map and/or the second distortion map. A device (e.g., the personal computing device 230) implementing the process 500 and a display device (e.g., the display device 124) may communicate through multi-peer connectivity. For example, a QR code (e.g., presented by the display device) may be used to facilitate multi-peer connectivity in finding a correct device to communicate with. For example, the data may be transmitted 560 via the wireless communications interface 340 of FIG. 3.

The process 500 may be modified to reorder, replace, add, or omit steps included in FIG. 5. For example, transmitting 560 data based on the first position and the second position to a display device may be omitted or replaced with storing data based on the first position and the second position, where a device used to capture the set of images is also used as a display device (e.g., by mounting the device in the head-mounted enclosure after the eye enrollment process is completed). For example, determining 530 orientations of one or more eyes may be omitted. For example, determining 540 three-dimensional transforms and determining 550 distortion maps may be omitted and/or instead performed by the display device receiving the data based on the first position and the second position that will use this calibration data to present images to the user wearing the head-mounted enclosure.

FIG. 6 is a flowchart of an example of a process 600 for determining a position for one or more eyes of a user (e.g., the user 110) relative to a head-mounted enclosure (e.g., the head-mounted enclosure 120). The process 600 includes determining 610, based on the set of images, a third position of another facial feature of the user relative to the head-mounted enclosure; accessing 620 a facial geometry model for the user; and determining 630 the positions of the one or more eyes (e.g., the right eye 114 and/or the left eye 116) based on the third position and the facial geometry model. By using the positions of other facial features to estimate the positions of the eyes, the enrollment process can function in cases where the head-mounted display partially or completely obscures the eyes (e.g., where the optical assembly is completely or partially opaque) in the set of images captured for eye enrollment. For example, the process 600 may be implemented by the display device 124 of FIG. 1. For example, the process 600 may be implemented by the personal computing device 230 of FIG. 2. For example, the process 600 may be implemented by the system 300 of FIG. 3.

In some cases, the eyes of a user cannot be seen when the user is wearing a head-mounted enclosure because the eyes are substantially or completely obscured by an optical assembly of the head-mounted enclosure. A personal computing device including a camera may be used to record the face and track the eyes of a user before the user starts wearing a head-mounted enclosure. When the user puts on the head-mounted enclosure, the camera of the personal computing device may be used again to take a picture, and an algorithm may be applied to calculate how to align the original face image over the visible face regions when wearing the head-mounted enclosure. This alignment information may be used to predict where the eyes are located in relation to the head-mounted enclosure worn by the user.

The process 600 includes determining 610, based on the set of images, a third position of another facial feature (e.g., a nose, a jaw, an ear, or a mouth) of the user relative to the head-mounted enclosure. Determining 610 the third position may include tracking the face of the user in the set of images and/or tracking the facial feature using computer vision processing applied to the set of images. The third position of the facial feature may be encoded as a three dimensional vector. The third position of the facial feature may be an offset from an origin point in a coordinate system of the head-mounted enclosure or in a coordinate system of a device performing an eye enrollment process (e.g., from in the hand of the user wearing the head-mounted enclosure).

The process 600 includes accessing 620 a facial geometry model for the user. For example, the facial geometry model for the user may have been previously determined and stored during a facial biometric profile registration process for the user. For example, the facial geometry model may be retrieved from a data storage device (e.g., the data storage device 320).

The process 600 includes determining 630 the first position (e.g., of the right eye 114) based on the third position and the facial geometry model. The process 600 may include determining 630 the second position (e.g., of the left eye 116) based on the third position and the facial geometry model. Determining 630 the first position may include determining and orientation of the face and adding a vector associated with the first eye and the other facial feature from the geometric facial model to the third position. Determining 630 the second position may include determining and orientation of the face and adding a vector associated with the second eye and the other facial feature from the geometric facial model to the third position.

Figure 7:
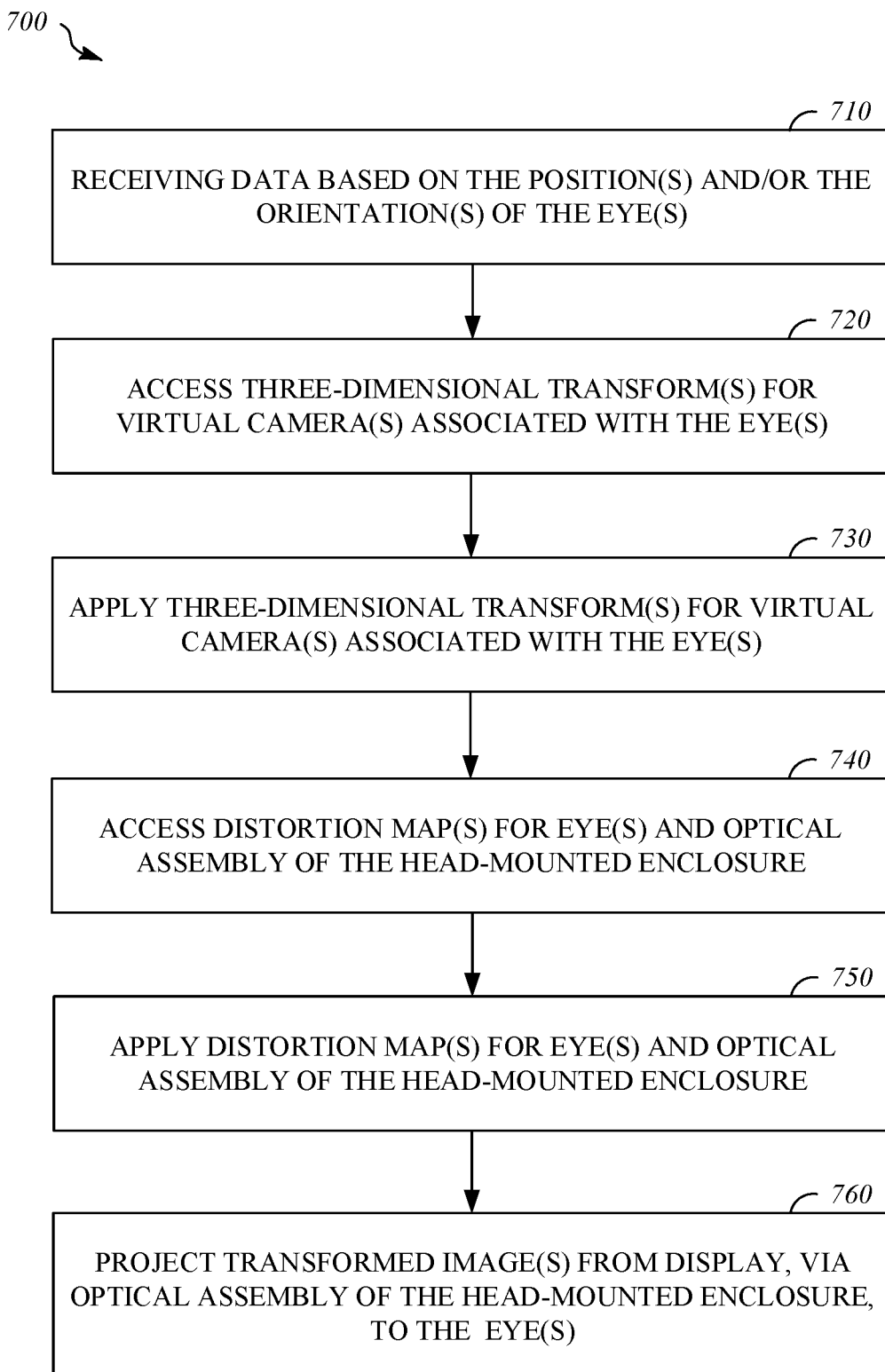
FIG. 7 is a flowchart of an example of a process for presenting images to a user via an optical assembly of a head-mounted enclosure, using eye enrollment data.

FIG. 7 is a flowchart of an example of a process 700 for presenting images to a user (e.g., the user 110) via an optical assembly (e.g., the optical assembly 126) of a head-mounted enclosure (e.g., the head-mounted enclosure 120), using eye enrollment data. The process 700 includes receiving 710 data based on the positions and/or the orientations of the eyes of the user; accessing 720 a three-dimensional transform for respective virtual cameras associated with the eyes; applying 730 the three-dimensional transform to an image to obtain a transformed image; accessing 740 a distortion map for respective eyes and the optical assembly; applying 750 a transformation based on the distortion map to an image to obtain a transformed image; and projecting 760 a respective transformed image from a display, via the optical assembly of the head-mounted enclosure, to a respective eye of the user. For example, the process 700 may be implemented by the display device 124 of FIG. 1. For example, the process 700 may be implemented by the system 400 of FIG. 4.

The process 700 includes receiving 710 data based on the positions and/or the orientations of the eyes of the user. In some implementations, the data based on the positions and/or the orientations of the eyes of the user may include a first position of a first eye (e.g., the right eye 114) and a second position of a second eye (e.g., the left eye 116). For example, the first position and the second position may be encoded as three-dimensional vectors in a coordinate system of the head-mounted enclosure. In some implementations, the data based on the positions and/or the orientations of the eyes of the user may include a first three-dimensional transform for the first eye and/or a second three-dimensional transform for the second eye that are encoded as matrices. In some implementations, the data based on the positions and/or the orientations of the eyes of the user may include a first distortion map for the first eye and/or a second distortion map for the second eye. For example, the data based on the positions and/or the orientations of the eyes of the user may be received 710 from a device (e.g., the personal computing device 230) that has performed an eye enrollment process (e.g., the process 500 of FIG. 5). For example, the data based on the positions and/or the orientations of the eyes of the user may be received 710 using the wireless communication interface 440 of FIG. 4.

The process 700 includes accessing 720 one or more three-dimensional transforms for respective virtual cameras associated with respective eyes of the user. The processing to determine the one or more three-dimensional transforms may be distributed between the sending device (e.g., the personal computing device 230) and the receiving device (e.g., the display device 124) in various ways. For example, the accessing 720 the one or more three-dimensional transforms may include reading the one or more three-dimensional transforms in a message received 710 from a device that performed an eye enrollment process (e.g., the process 500 of FIG. 5). For example, the one or more three-dimensional transforms may be retrieved from a data storage device (e.g., the data storage device 420). For example, the accessing 720 the one or more three-dimensional transforms may include determining (e.g., as described in relation to step 540 of FIG. 5) the one or more three-dimensional transforms based on data, including positions and/or orientations for the eyes, received 710 from a device (e.g., the personal computing device 230) that has performed an eye enrollment process.

The process 700 includes applying 730 the one or more three-dimensional transforms to an image to obtain a transformed image. For example, the process 700 may include applying 730 the first three-dimensional transform to an image to obtain a first transformed image (e.g., for the right eye 114), and applying 730 the second three-dimensional transform to an image to obtain a second transformed image (e.g., for the left eye 116).

The process 700 includes accessing 740 one or more distortion maps for respective eyes of the user and the optical assembly. The processing to determine the one or more distortion maps may be distributed between the sending device (e.g., the personal computing device 230) and the receiving device (e.g., the display device 124) in various ways. For example, the accessing 720 the one or more distortion maps may include reading the one or more distortion maps in a message received 710 from a device that performed an eye enrollment process (e.g., the process 500 of FIG. 5). For example, the one or more three-dimensional transforms may be retrieved from a data storage device (e.g., the data storage device 420). For example, the accessing 720 the one or more distortion maps may include determining (e.g., as described in relation to step 550 of FIG. 5) the one or more distortion maps based on data, including positions and/or orientations for the eyes, received 710 from a device (e.g., the personal computing device 230) that has performed an eye enrollment process.

The process 700 includes applying 750 a transformation based on the distortion map to an image to obtain a transformed image. For example, the process 700 may include applying 750 a transformation based on the first distortion map to an image to obtain a first transformed image (e.g., for the right eye 114), and applying 750 the transformation based on the second distortion map to an image to obtain a second transformed image (e.g., for the left eye 116).

The process 700 includes projecting 760 the transformed image from a display (e.g., the display 430), via an optical assembly (e.g., the optical assembly 126) of the head-mounted enclosure, to the first eye (e.g., the right eye 114). The process 700 may include projecting 760 the second transformed image from the display, via the optical assembly of the head-mounted enclosure, to the second eye (e.g., the left eye 116).

The process 700 may be modified to reorder, replace, add, or omit steps included in FIG. 7. For example, receiving 710 data based on the positions and/or the orientations of the eyes may be omitted or replaced with accessing data based on the first position and the second position, where a device used to capture the set of images is also used as a display device (e.g., by mounting the device in the head-mounted enclosure after the eye enrollment process is completed). For example, accessing 740 and applying 750 the one or more distortion maps may be omitted.

In some implementations, an eye enrollment process (e.g. the process 500 of FIG. 5) may track the head-mounted enclosure in a set of captured images using image tracking techniques, and use information about the pose (i.e., position and orientation) of the head-mounted enclosure to focus a search for the eyes of the user. Configuration information associated with head-mounted enclosure may specify a region of interest in relation to the tracked pose of the head-mounted enclosure where the eyes of the user are expected to be positioned during normal use of the head-mounted enclosure. Computer vision processing may be applied in a focused search within the region of interest of a captured image to determine the position and/or orientation of one or more eyes of the user in relation to the head-mounted enclosure.

Figure 8A:
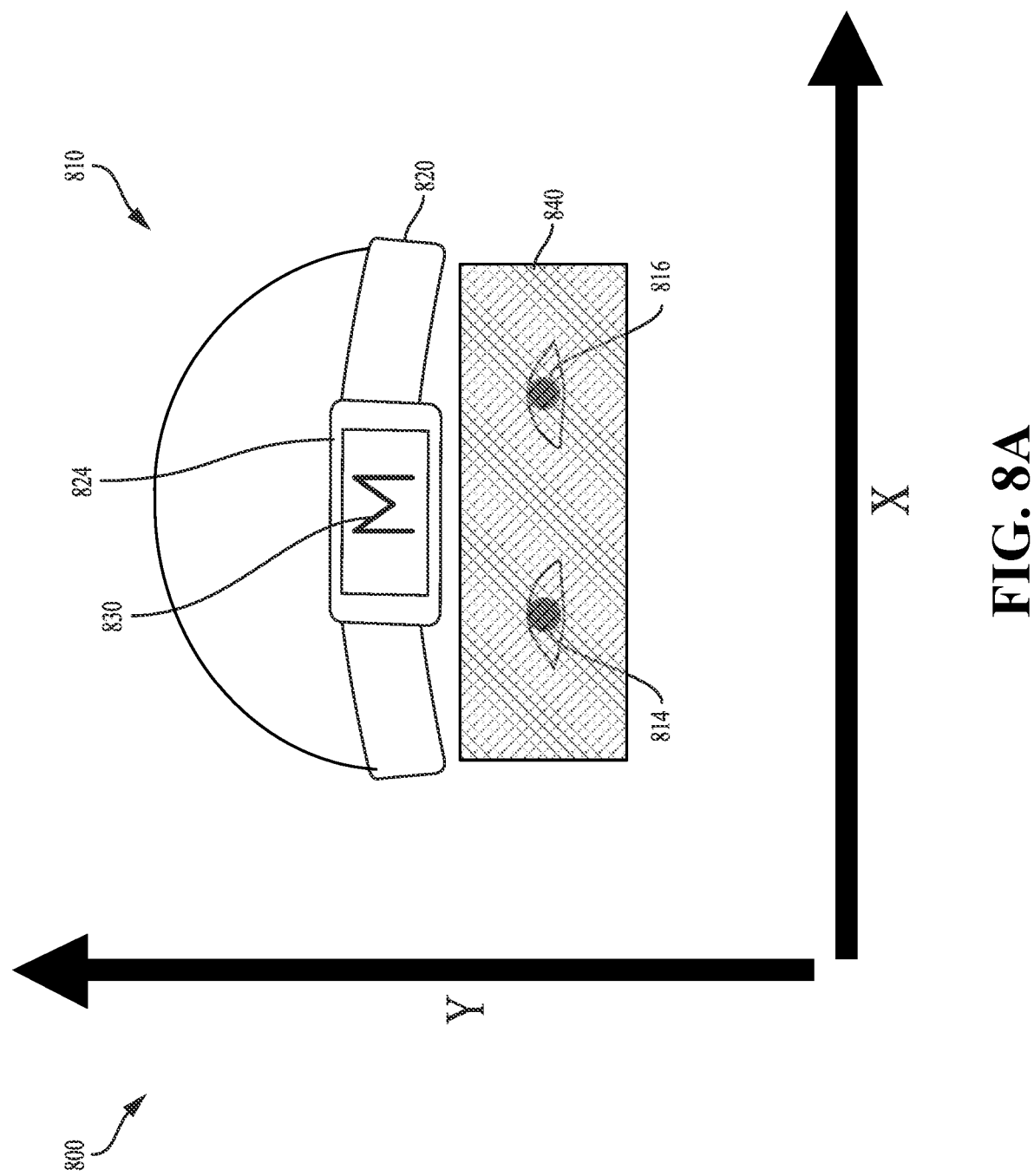
FIG. 8A is an illustration of an example of a region of interest in an image depicting a head-mounted enclosure worn by a user that is used to narrow a search for eyes of the user.

FIG. 8A is an illustration of an example of a region of interest 840 in an image 800 depicting a head-mounted enclosure 820 worn by a user 810 that is used to narrow a search for eyes (814 and 816) of the user 810. In this example, the head-mounted enclosure 820 includes a display device 824 that is configured to display a marker 830 during an eye enrollment process (e.g., the process 500 of FIG. 5). In some implementations (not shown in FIG. 8A), the marker 830 may be a physical marker that is permanently displayed on an outer surface of the head-mounted enclosure 820. For example, the marker 830 may include a manufacturer logo or a symbol with sufficient asymmetry to allow a pose of the marker to be determined from an image of the marker taken from a range of viewing angles. The head-mounted enclosure 820 may also include a visor (not explicitly shown in FIG. 8A) including an optical assembly (e.g., the optical assembly 126), which may partially obscure or distort a view of the eyes (814 and 816) of the user 110 from the device capturing the image 800.

The image 800 may be captured as part of a set of images during the eye enrollment process. The marker 830 may then be detected in the image 800 using computer vision processing to detect the marker 830 in the image 800 and/or track the marker across the set of images. A pose of the marker 830 (i.e., a position and an orientation) relative to a device capturing the set of images may be determined based on the image 800 and/or additional images in the set of images captured during the eye enrollment process. The pose of the marker may be used to determine the pose of the head-mounted enclosure.

The region of interest 840, which is to be searched for the eyes (814 and 816), may be determined based on the pose of the marker 830 and/or the head-mounted enclosure 820. For example, configuration data associated with the head-mounted enclosure 820 may specify a virtual polygon (e.g., a rectangle) in three-dimensional space with a transform relative to the marker 830 to isolate a region where eyes can be found. In some implementations, the polygon may be projected onto the image 800 to determine the region of interest 840.

The region of interest 840 may then be used to determine locations and/or orientations of the eyes (814 and 816). For example, computer vision processing may be applied to the region of interest 840 to determine locations and/or orientations of the eyes (814 and 816). For example, the image 800 may be cropped to the region of interest 840 and the resulting cropped image may be input to a computer vision module (e.g., including a convolutional neural network) to obtain the positions and/or orientations of the eyes (814 and 816). In some implementations, the cropped image may be presented to a user (e.g., the user 810) who is prompted to identify the locations of the eyes (814 and 816), such as by selecting corresponding pixels by tapping on or circling the eye 814 and the eye 816 in the cropped image. In some implementations, the region of interest 840 may be rotated to a standard orientation before being passed to a computer vision module or presented to a user. The locations and/or orientations of the eyes (814 and 816) relative to the head-mounted enclosure 820 may be determined based on pixel coordinates of pixels identified as corresponding to the eyes (814 and 816). For example, estimates of inter-pupil distance (IPD) and Y (vertical) offset with respect to the head-mounted enclosure may be determined. In some implementations, a front visor of the head-mounted enclosure can be removed during an eye enrollment process, and a depth property sensed by a computing device (e.g., the personal computing device 230) that captures the image 800 may be used to estimate depth of the eyes (814 and 816) relative to device.

Once the positions and/or orientations of the eyes (814 and 816) with respect to the head-mounted enclosure 820 are determined, eye transformations can be determined based on the eye positions and/or orientations for use in the head-mounted enclosure 820 to display images to the user 810.

Figure 8B:
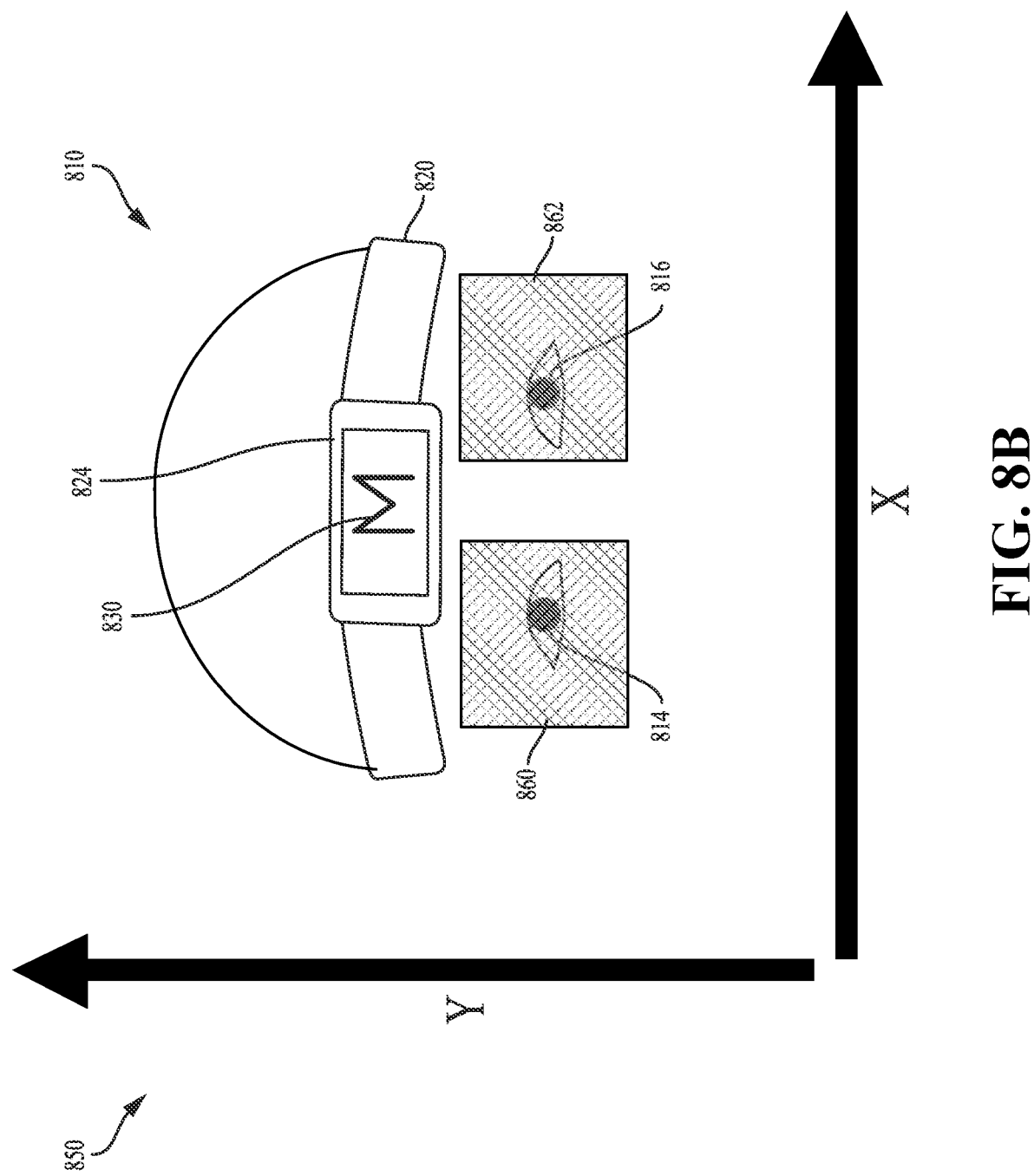
FIG. 8B is an illustration of an example of two regions of interest in an image depicting a head-mounted enclosure worn by a user that are used to narrow a search for eyes of the user.

FIG. 8B is an illustration of an example of two regions of interest (860 and 862) in an image 850 depicting a head-mounted enclosure 820 worn by a user 810 that are used to narrow a search for eyes (814 and 816) of the user 810. The image 850 is captured in the same manner as the image 800 of FIG. 8A, and the marker 830 may be detected using the same techniques. In the example of FIG. 8B, two regions of interest (860 and 862) are determined based on the pose of the marker 830 depicted in the image 850. A first region of interest 860 is determined for the right eye 814 of the user 810, and a second region of interest 862 is determined for the left eye 816 of the user 810. The search for each eye may then be conducted within its own respective region of interest.

Figure 9:
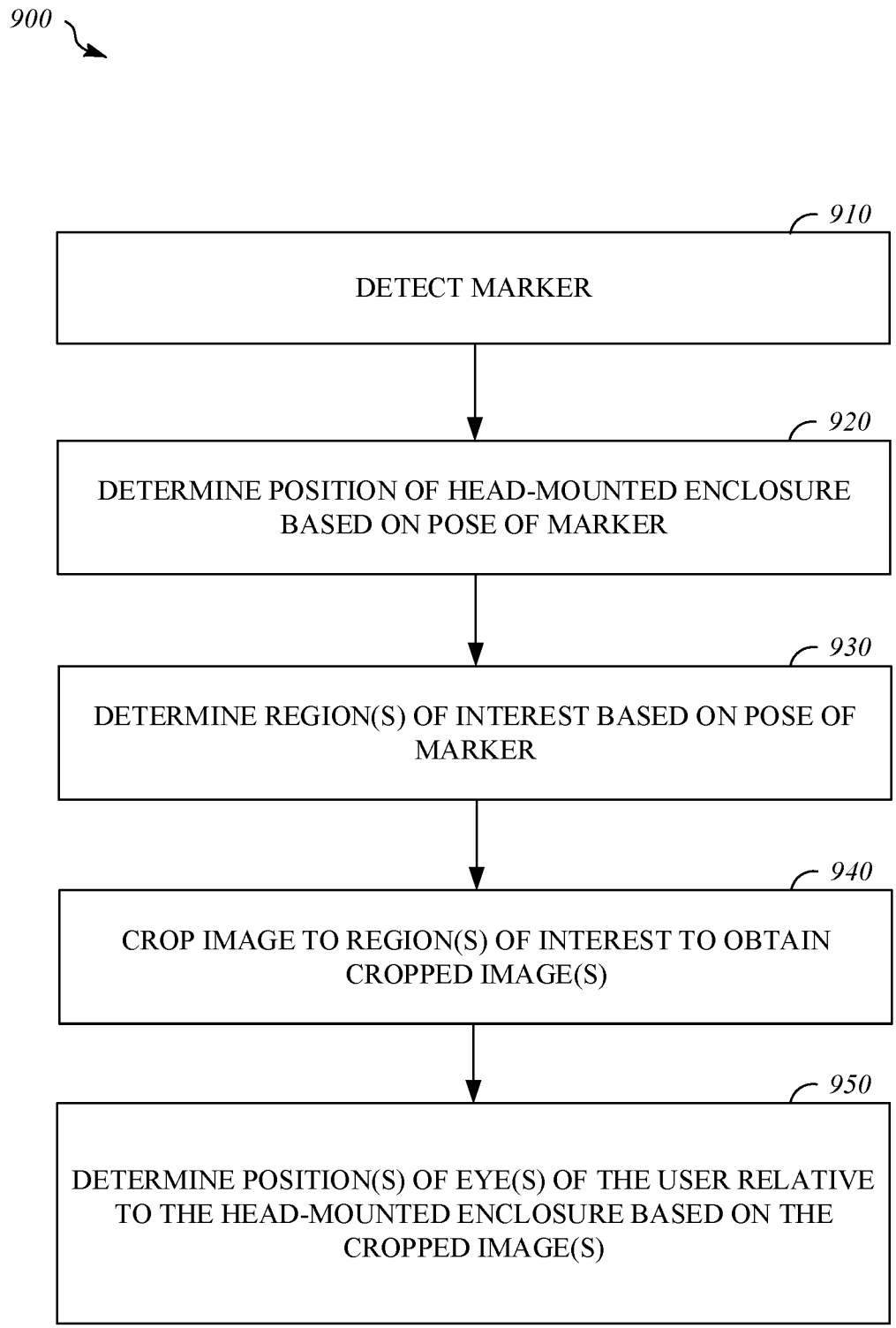
FIG. 9 is a flowchart of an example of a process for determining a position for one or more eyes of a user relative to a head-mounted enclosure using a region of interest based on a detected marker of the head-mounted enclosure.

FIG. 9 is a flowchart of an example of a process 900 for determining a position for one or more eyes of a user relative to a head-mounted enclosure using a region of interest based on a detected marker of the head-mounted enclosure. The process 900 includes detecting 910 a marker on the head-mounted enclosure in the set of images; determining 920 a position of the head-mounted enclosure based on a pose of the marker; determining 930 a region of interest in a first image of the set of images based on a pose of the marker; cropping 940 the first image to the region of interest to obtain a cropped image; and determining 950 a position of one or more eyes of the user based on the cropped image. For example, the process 900 may be implemented by the personal computing device 230 of FIG. 2. For example, the process 900 may be implemented by the system 300 of FIG. 3.

The process 900 includes detecting 910 a marker on the head-mounted enclosure in the set of images. In some implementations, the marker may be a physical marker that is permanently displayed on an outer surface of the head-mounted enclosure. For example, the marker may include a manufacturer logo or a symbol with sufficient asymmetry to allow a pose of the marker to be determined from an image of the marker taken from a range of viewing angles. In some implementations, the head-mounted enclosure includes a display device that is configured to display the marker during an eye enrollment process (e.g., the process 500 of FIG. 5). For example, the marker may be detected 910 using computer vision and/or image tracking software. For example, a pose (i.e., a position and orientation) of the marker may be determined by finding a spatial transformation (e.g., a displacement and a rotation) that when applied to the known image of the marker, matches the marker as it appears in a captured image of the set images. For example, detecting 910 the marker may include applying object tracking software one or more images in the set of images to determine a pose of the marker as depicted in one or more images in the set of images.

The process 900 includes determining 920 a position of the head-mounted enclosure based on a pose of the marker. The marker may be displayed at a fixed location on a rigid portion of the head-mounted enclosure. Thus, the pose of the head-mounted enclosure, or at least the rigid portion of the head-mounted enclosure, may be determined 920 based on (e.g., as equal to) the pose of the marker. In some implementations, a preconfigured spatial transformation may be applied to pose of the marker to determine 920 a pose of another component of the head-mounted enclosure.

The process 900 includes determining 930 a region of interest in a first image of the set of images based on a pose of the marker. The region of interest (e.g., the region of interest 840 of FIG. 8A) is a portion of a captured image that is identified as depicting a likely location of one or more eyes of a user wearing the head-mounted enclosure. In some implementations, determining 930 the region of interest may include determining a polygon (e.g., a rectangle, a hexagon, or a circle) with a pose that is based on the pose of the marker, and determining the region of interest as a projection of the polygon onto the first image. For example, configuration data associated with the head-mounted enclosure may specify a virtual polygon ((e.g., a rectangle, a hexagon, or a circle) in three-dimensional space with a transform relative to the marker to isolate a region where eyes can be found. The transform of the configuration may be applied to the pose of the marker, or equivalently to pose of another component of the head-mounted display derived from the pose of the marker, to determine the virtual polygon defining the region of interest. In some implementations, multiple regions of interest may be determined 930 in the first image based on the pose of the marker. For example, a region of interest may be determined 930 for each eye of the user (e.g., the regions of interest (960 and 962) for the respective eyes (914 and 916) of FIG. 8B).

The process 900 includes cropping 940 the first image to the region of interest to obtain a cropped image. Cropping 940 the first image to the region of interest may facilitate the determination of eye positions and/or orientations by focus computing resources and/or user attention on the region of interest. In some implementations, cropping 940 of the first image is accomplished by copying a subset of the pixel values of the first image to a new cropped image data structure that can be passed on for further processing. In some implementations, cropping 940 of the first image is accomplished by simply selecting a subset of the pixel values of the first image to be passed on for further processing, without necessarily making a new copy of those pixel values. In some implementations, multiple regions of interest may be cropped 940 in the first image to obtain multiple cropped images, such as one cropped image for each eye of a user.

The process 900 includes determining 950 a position of an eye of the user (e.g., the first position of the first eye of the user) based on the cropped image. For example, computer vision processing may be applied to the cropped image to determine locations and/or orientations of the eyes (e.g., the eye 814 and the eye 816 of FIG. 8A). For example, cropped image may be input to a computer vision module (e.g., including a convolutional neural network) to obtain the positions and/or orientations of one or more eyes of the user. In some implementations, the cropped image may be presented to a user who is prompted to identify the locations of the eyes, such as by selecting corresponding pixels by tapping on or circling the one or more eyes in the cropped image. In some implementations, the region of interest 840 may be rotated to a standard orientation (e.g., a rectangular region of interest may be rotated so that one of its long edges is the bottom of the cropped image and the other long edge is the top of the cropped image) before being passed to a computer vision module or presented to a user. The locations and/or orientations of the one or more eyes relative to the head-mounted enclosure may be determined based on pixel coordinates of pixels identified as corresponding to the eyes. For example, estimates of inter-pupil distance (IPD) and Y (vertical) offset with respect to the head-mounted enclosure may be determined. In some implementations, a front visor of the head-mounted enclosure can be removed during an eye enrollment process, and a depth property (e.g., in a depth channel of an image) sensed by a computing device (e.g., the personal computing device 230) that captures the set of images may be used to estimate depth of the eyes relative to device. For example, rays at the center of each eye and the depth at the center of each eye may be used to determine positions for the eyes. For example, the first image may include a depth channel and the first position of the first eye may be determined 950 based on depth channel data of the cropped image. In some implementations, an image sensor does not provide depth data, and the depth of the detected objects appearing in the three-dimensional surface may be estimated as an appropriate depth by testing different depths for the surrounding eye features (e.g., a nose bridge, eyebrows, or corners of eyes) and utilizing the one with the least swimming (e.g., variations from expected projections across a sequence of images). In some implementations, determining 950 a position of an eye of the user includes filtering (e.g., averaging) cropped images taken from multiple images in the set of images using respective regions of interest for each of those images to generate a filtered cropped image with suppressed noise. For example, filtering of images of the region of interest over time and/or from a diversity of perspectives, may serve to suppress distortions (e.g., glare on a visor of the head-mounted enclosure that is partially obscuring the eye) occurring in the first image.

The techniques of the process 900 of FIG. 9 may also be applied to determine a position and/or an orientation for other facial features (e.g., eye lid, eye lash, or eyebrows) of a user relative to a head-mounted enclosure using a region of interest based on a detected marker of the head-mounted enclosure.

Figure 10:
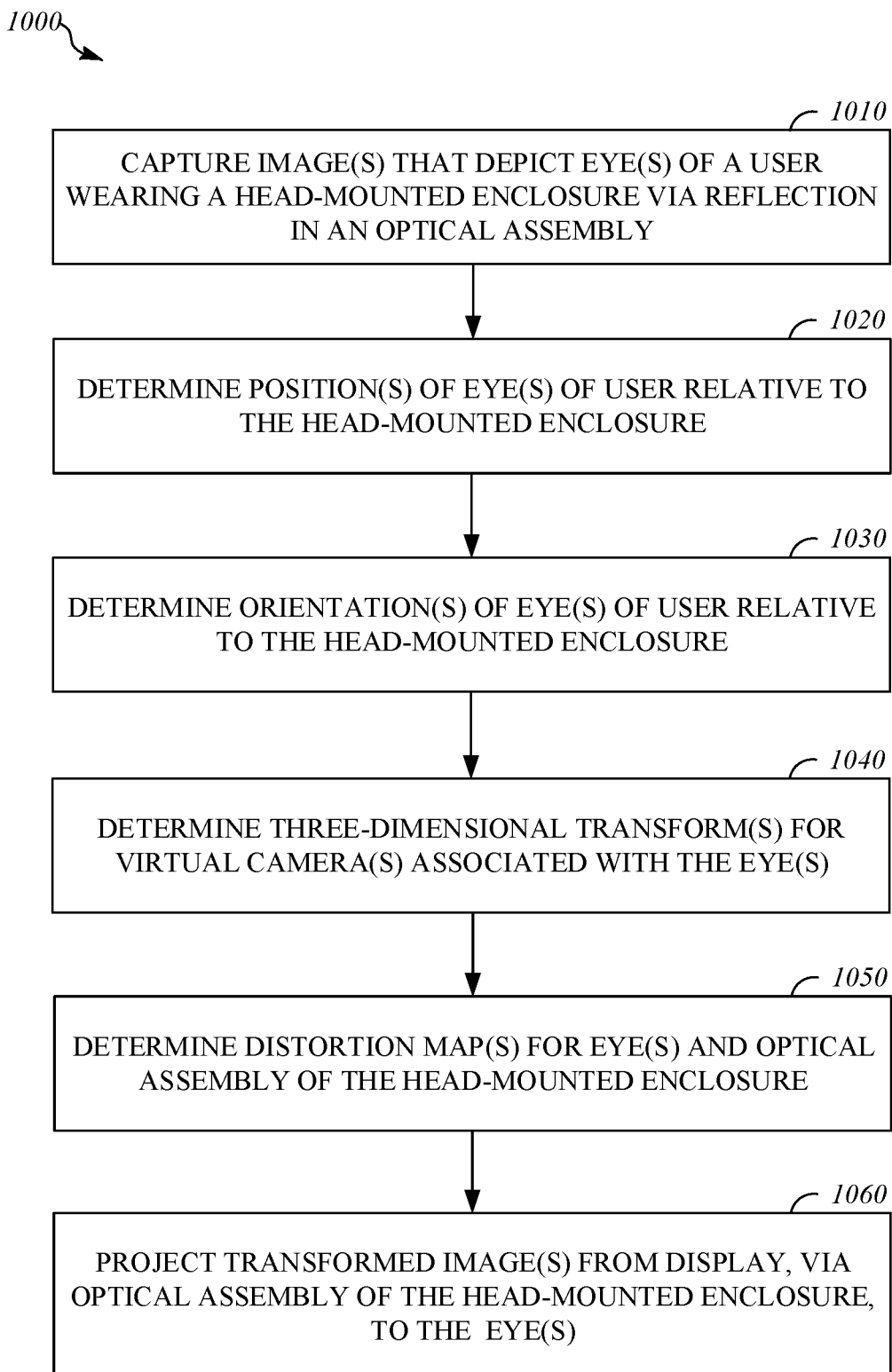
FIG. 10 is a flowchart of an example of a process for eye enrollment for a head-mounted enclosure.

FIG. 10 is a flowchart of an example of a process 1000 for eye enrollment for a head-mounted enclosure (e.g., the head-mounted enclosure 120 or the head-mounted enclosure 820). The process 1000 includes capturing 1010 a set of images that depict one or more eyes of a user via reflection in an optical assembly of a head-mounted enclosure that the user is wearing; determining 1020 positions of one or more eyes of the user relative to the head-mounted enclosure; determining 1030 orientations of one or more eyes of the user relative to the head-mounted enclosure; determining 1040 respective three dimensional transforms for respective virtual cameras associated with the one or more eyes of the user; determining 1050 distortion maps for one or more eyes of the user and an optical assembly of the head-mounted enclosure; and projecting 1060 a respective transformed image from a display, via the optical assembly of the head-mounted enclosure, to a respective eye of the user. For example, the process 1000 may be implemented by the personal computing device 230 of FIG. 2. For example, the process 1000 may be implemented by the system 300 of FIG. 3.

The process 1000 includes capturing 1010 a set of images that depict one or more eyes of a user (e.g., the user 110) via reflection in an optical assembly (e.g., the optical assembly 126) of a head-mounted enclosure (e.g., the head-mounted enclosure 120) that the user is wearing. The set of images may be captured 1010 using an image sensor attached to the head-mounted enclosure (e.g., a front camera of the display device 124). For example, when the display device is mounted in the head-mounted enclosure and the user is wearing the head-mounted disclosure, the image sensor may have a view via reflection in an optical assembly (e.g., including a mirror and/or a lens) of the eyes and/or an identifiable region of a face (e.g., the corners of the eyes or the bridge of a nose) that the eyes are known to be related to. For example, the set of images may include visible spectrum color (e.g., RGB or YUV) images and/or infrared images.

In some implementations, views of the eyes via reflection in the optical assembly may available to an image sensor of the display device (e.g., a front camera of the display device 124) as the display device is in the process of being mounted in the head-mounted enclosure (e.g., the head-mounted enclosure 120) while the user is wearing the head-mounted enclosure. For example, where the display device is inserted into a secure mounted position in the head-mounted enclosure (e.g., sliding along guide rails) one or more motion sensors may be used determine the position of display device relative to the head-mounted enclosure as it is being moved into the mounted position and capture 1010 one or more of the set of images that depict one or more eyes of a user (e.g., the user 110) via reflection in an optical assembly from these other perspectives as the display devices is moved into its final mounted position. For example, the process 1000 may include detecting that a personal computing device, including an image sensor used to capture the set of images, is being mounted in the head-mounted enclosure. The set of images may include images captured during a mounting motion before the personal computing device enters a mounted position in the head-mounted enclosure. For example, detecting that the personal computing device is being mounted in the head-mounted enclosure may include receiving mounting command or indication from a user and/or detecting proximity to the head-mounted enclosure using a proximity sensor. For example, capturing 1010 at least some of the set of images while the display device is being mounted may be particularly useful when the front camera of the display device is blocked in the mounted position, and it may provide images of the eyes from a diversity of views to aide in detection of the eyes.

The process 1000 includes determining 1020, based on the set of images, a first position of a first eye (e.g., the right eye 114) of the user relative to the head-mounted enclosure. Determining 1020 the first position may tracking the first eye using computer vision processing applied to the set of images. For example, determining 1020 the first position may include applying a transform, based on an optical model of the optical assembly, to the set of images. In some implementations, the position of the first eye may be determined 1020 based in part on prior registered geometric model of the face of the user and tracking a collection of one or more other features of the face (e.g., the corners of the eyes or the bridge of a nose). For example, the process 600 of FIG. 6 may be implemented to determine 1020 the first position of the first eye relative to the head-mounted enclosure. The first position of the first eye may be encoded as a three dimensional vector in a coordinate system of the head-mounted enclosure. The first position of the first eye may be an offset from an origin point in the coordinate system of the head-mounted enclosure. The process 1000 may also include determining 1020, based on the set of images, a second position of a second eye (e.g., the left eye 116) of the user relative to the head-mounted enclosure. The second position of the second eye may be determined 1020 using techniques applied to the set of images that are the same or similar to the techniques used to determine 1020 the first position of the first eye. For example, the process 600 of FIG. 6 may be implemented to determine 1020 the second position of the second eye relative to the head-mounted enclosure.

The process 1000 includes determining 1030, based on the set of images, a first orientation of the first eye (e.g., the right eye 114) of the user relative to the head-mounted enclosure. For example, determining 1030 the first orientation may include applying a transform, based on an optical model of the optical assembly, to the set of images. The process 1000 may also include determining 1030, based on the set of images, a second orientation of the second eye (e.g., the left eye 116) of the user relative to the head-mounted enclosure. For example, determining 1030 an orientation of an eye may include tracking a pupil of the eye relative to one or more other features of the face of the user. For example, an orientation of an eye may be encoded as three-tuple of Euler angles or a quaternion expressed in a coordinate system of the head-mounted enclosure.

The process 1000 includes determining 1040, based on the first position, a first three-dimensional transform for a first virtual camera associated with the first eye. The process 1000 may include determining 1040, based on the second position, a second three-dimensional transform for a second virtual camera associated with the second eye. For example, the one or more three-dimensional transforms may respectively be encoded as 4×4 3-D transformation matrices. For example, the one or more three-dimensional transforms may include a perspective projection matrix. For example, the first three-dimensional transform and/or the second three-dimensional transform may be determined 1040 relative to an origin of calibration in a coordinate system of the head-mounted enclosure. In some implementations, determining 1040 a three dimensional transform for an eye includes retrieving a pre-calculated transform from a look-up table that is indexed by a quantized version of the position of the eye relative to the head-mounted enclosure. In some implementations, the first three-dimensional transform is determined 1040 based on the orientation of the first eye, in addition to the position of the first eye. In some implementations, the second three-dimensional transform is determined 1040 based on the orientation of the second eye, in addition to the position of the second eye.

The process 1000 includes determining 1050, based on the first position, a first distortion map for the first eye and an optical assembly (e.g., a lens) of the head-mounted enclosure. The process 1000 may include determining 1050, based on the second position, a second distortion map for the second eye and an optical assembly (e.g., a lens) of the head-mounted enclosure. In some implementations, determining 1050 a distortion map for an eye includes retrieving a pre-calculated distortion map from a look-up table that is indexed by a quantized version of the position of the eye relative to the head-mounted enclosure. In some implementations, the first distortion map is determined 1040 based on the orientation of the first eye, in addition to the position of the first eye. In some implementations, the second distortion map is determined 1040 based on the orientation of the second eye, in addition to the position of the second eye.

The process 1000 includes projecting 1060 a first transformed image, based on the first three-dimensional transform and/or the first distortion map, from a display (e.g., the display 430), via an optical assembly (e.g., the optical assembly 126) of the head-mounted enclosure, to the first eye (e.g., the right eye 114). The process 1000 may include projecting 1060 a second transformed image, based on the second three-dimensional transform and/or the second distortion map, from the display, via the optical assembly of the head-mounted enclosure, to the second eye (e.g., the left eye 116).

The process 1000 may be modified to reorder, replace, add, or omit steps included in FIG. 10. For example, projecting 1060 the first transformed image and/or the second transformed image may be omitted or replaced with storing data based on the first position and the second position, where a device used to capture the set of images is also used as a display device. For example, determining 1030 orientations of one or more eyes may be omitted. For example, determining 1040 three-dimensional transforms and determining 1050 distortion maps may be omitted and/or instead performed by the display device receiving the data based on the first position and the second position that will use this calibration data to present images to the user wearing the head-mounted enclosure.

Physical Environment
a. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality
a. In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).
b. A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.
c. Examples of CGR include virtual reality and mixed reality.

Virtual Reality
a. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality
a. In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.
b. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.
c. Examples of mixed realities include augmented reality and augmented virtuality.
d. Augmented reality
 i. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display, A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.
  ii. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.
e. Augmented virtuality
  i. An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone).

As described above, one aspect of the present technology is the gathering and use of data available from various sources to improve the image quality and the user experience. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to tailor images displayed in a head-mounted enclosure for the topology of a user's head. Further, other uses for personal information data that benefit the user are also contemplated by the present disclosure. For instance, health and fitness data may be used to provide insights into a user's general wellness, or may be used as positive feedback to individuals using technology to pursue wellness goals. The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country. Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a head-mounted enclosure may be configured based on non-personal information data or a bare minimum amount of personal information, such as the content being requested by the device associated with a user, other non-personal information available to the head-mounted enclosure, or publicly available information.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
    an image sensor; and
    a processing apparatus configured to:
        access an image, captured using the image sensor, that depicts at least a portion of a face of a user and at least a portion of a head-mounted enclosure that the user is wearing;
        detect a marker on the head-mounted enclosure in the image;
        determine a region of interest in the image based on a pose of the marker, wherein the image depicts an eye of the user in the region of interest; and
        determine, based on analysis of the region of interest, a first position of a first facial feature of the user relative to the head-mounted enclosure.

2. The system of claim 1, wherein the processing apparatus is configured to:
    crop the image to the region of interest to obtain a cropped image, wherein the first position is determined based on the cropped image.

3. The system of claim 1, wherein the processing apparatus is configured to:
    determine a polygon with a pose that is based on the pose of the marker; and
    determine the region of interest as a projection of the polygon onto the image.

4. The system of claim 1, wherein the image includes depth data and the first position is determined based on depth data of the region of interest.

5. The system of claim 1, wherein the first facial feature is a first eye and the processing apparatus is configured to:
    determine, based on analysis of the region of interest, a second position of a second eye of the user relative to the head-mounted enclosure.

6. The system of claim 1, wherein the first facial feature is a first eye and the processing apparatus is configured to:
    determine a second region of interest in the image based on the pose of the marker; and
    determine, based on analysis of the second region of interest, a second position of a second eye of the user relative to the head-mounted enclosure.

7. The system of claim 1, wherein the processing apparatus is configured to:
    determine, based on the first position, a three-dimensional transform for a first virtual camera associated with a first eye of the user.

8. The system of claim 7, comprising a display and wherein the processing apparatus is configured to:
    apply the three-dimensional transform to an output image to obtain a transformed image; and
    project the transformed image from the display, via an optical assembly of the head-mounted enclosure, to the first eye.

9. The system of claim 1, comprising a display and wherein the first facial feature is a first eye and the processing apparatus is configured to:
    determine, based on the first position, a distortion map for the first eye and an optical assembly of the head-mounted enclosure;
    apply a transformation based on the distortion map to an output image to obtain a transformed image; and
    project the transformed image from the display, via an optical assembly of the head-mounted enclosure, to the first eye.

10. The system of claim 1, wherein the processing apparatus is configured to:
    determine, based on the image, a second position of another facial feature of the user relative to the head-mounted enclosure;
    access a facial geometry model for the user; and
    determine the first position based on the second position and the facial geometry model.

11. The system of claim 1, comprising a wireless communications interface and wherein the processing apparatus is configured to:
    transmit data based on the first position to a display device that is mounted in the head-mounted enclosure.

12. The system of claim 1, wherein the image sensor is attached to the head-mounted enclosure, and the image is captured using an external mirror.

13. The system of claim 1, wherein the image is an infrared image.

14. The system of claim 1, wherein the image is a visible spectrum color image.

15. A method comprising:
    capturing an image that depicts at least a portion of a face of a user and at least a portion of a head-mounted enclosure that the user is wearing;
    detecting a marker on the head-mounted enclosure in the image;
    determining a region of interest in the image based on a pose of the marker, wherein the image depicts an eye of the user in the region of interest; and determining, based on pixels of the image in the region of interest, a first position of a first facial feature of the user relative to the head-mounted enclosure.

16. The method of claim 15, wherein determining the first position of the first facial feature of the user relative to the head-mounted enclosure comprises:
cropping the image to the region of interest to obtain a cropped image; and
determining, based on the cropped image, the first position of the first facial feature of the user relative to the head-mounted enclosure.

17. The method of claim 15, wherein determining the region of interest comprises:
determining a polygon with a pose that is based on the pose of the marker; and
determining the region of interest as a projection of the polygon onto the image.

18. The method of claim 15, comprising:
determining, based on the first position, a three-dimensional transform for a first virtual camera associated with a first eye of the user;
applying the three-dimensional transform to an output image to obtain a transformed image; and
projecting the transformed image from a display, via an optical assembly of the head-mounted enclosure, to the first eye.

19. The method of claim 15, wherein determining the first position comprises:
determining, based on the image, a third position of another facial feature of the user relative to the head-mounted enclosure;
accessing a facial geometry model for the user; and
determining the first position based on the third position and the facial geometry model.

20. The method of claim 19, wherein the facial geometry model is stored during a facial biometric profile registration process for the user.

21. A method comprising:
capturing, by a personal computing device, an image that depicts one or more eyes of a user via reflection off an optical assembly of a head-mounted enclosure that the user is wearing;
determining, based on the image, a first spatial position of a first eye of the user relative to the head-mounted enclosure; and
determining, based on the image, a second spatial position of a second eye of the user relative to the head-mounted enclosure.

22. The method of claim 21, comprising:
detecting that the personal computing device, including an image sensor used to capture the image, is being mounted in the head-mounted enclosure, wherein the image is captured during a mounting motion before the personal computing device enters a mounted position in the head-mounted enclosure.

23. The method of claim 22, wherein detecting that the personal computing device is being mounted in the head-mounted enclosure includes detecting, using a proximity sensor, a proximity of the personal computing device to the head-mounted enclosure.

24. The method of claim 21, comprising:
determining, based on the first position, a first three-dimensional transform for a first virtual camera associated with the first eye;
determining, based on the second position, a second three-dimensional transform for a second virtual camera associated with the second eye;
applying the first three-dimensional transform to an output image to obtain a first transformed image;
projecting the first transformed image from a display, via an optical assembly of the head-mounted enclosure, to the first eye;
applying the second three-dimensional transform to an output image to obtain a second transformed image; and
projecting the second transformed image from the display, via the optical assembly of the head-mounted enclosure, to the second eye.

* * * * *